Nov. 28, 1950  R. W. CUMMINGS ET AL  2,531,555
ARTICLE-FORMING SYSTEM
Filed May 3, 1946  14 Sheets-Sheet 1

Inventors
Roy W. Cummings
George F. C. Burke
By their Attorney

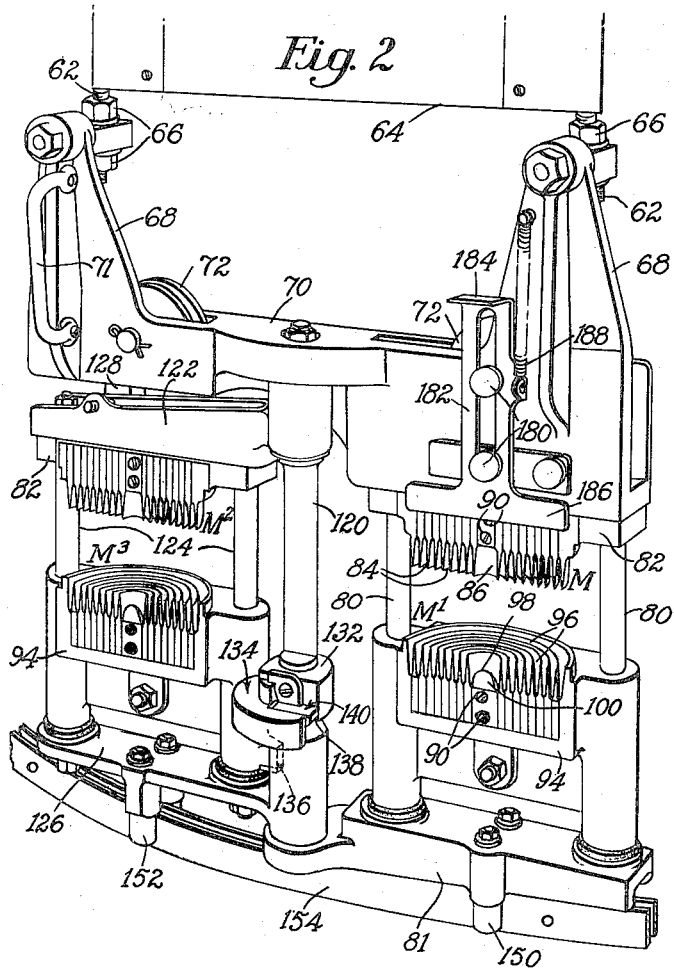
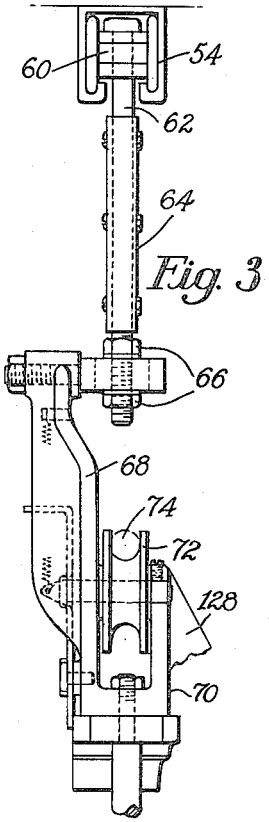
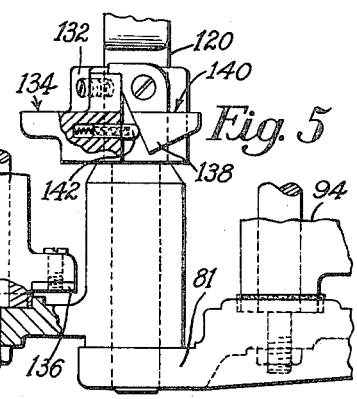
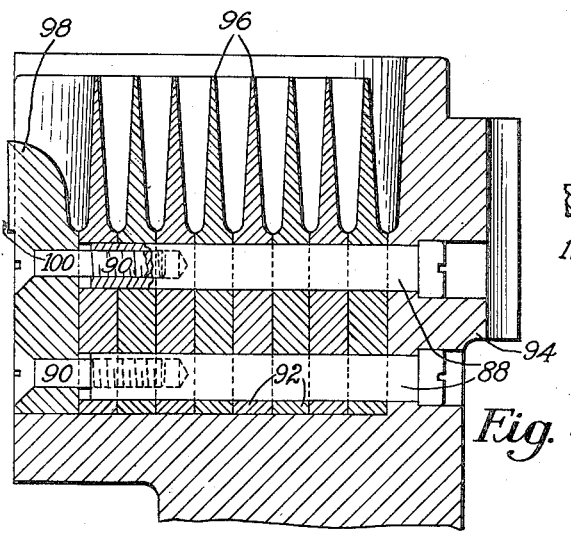

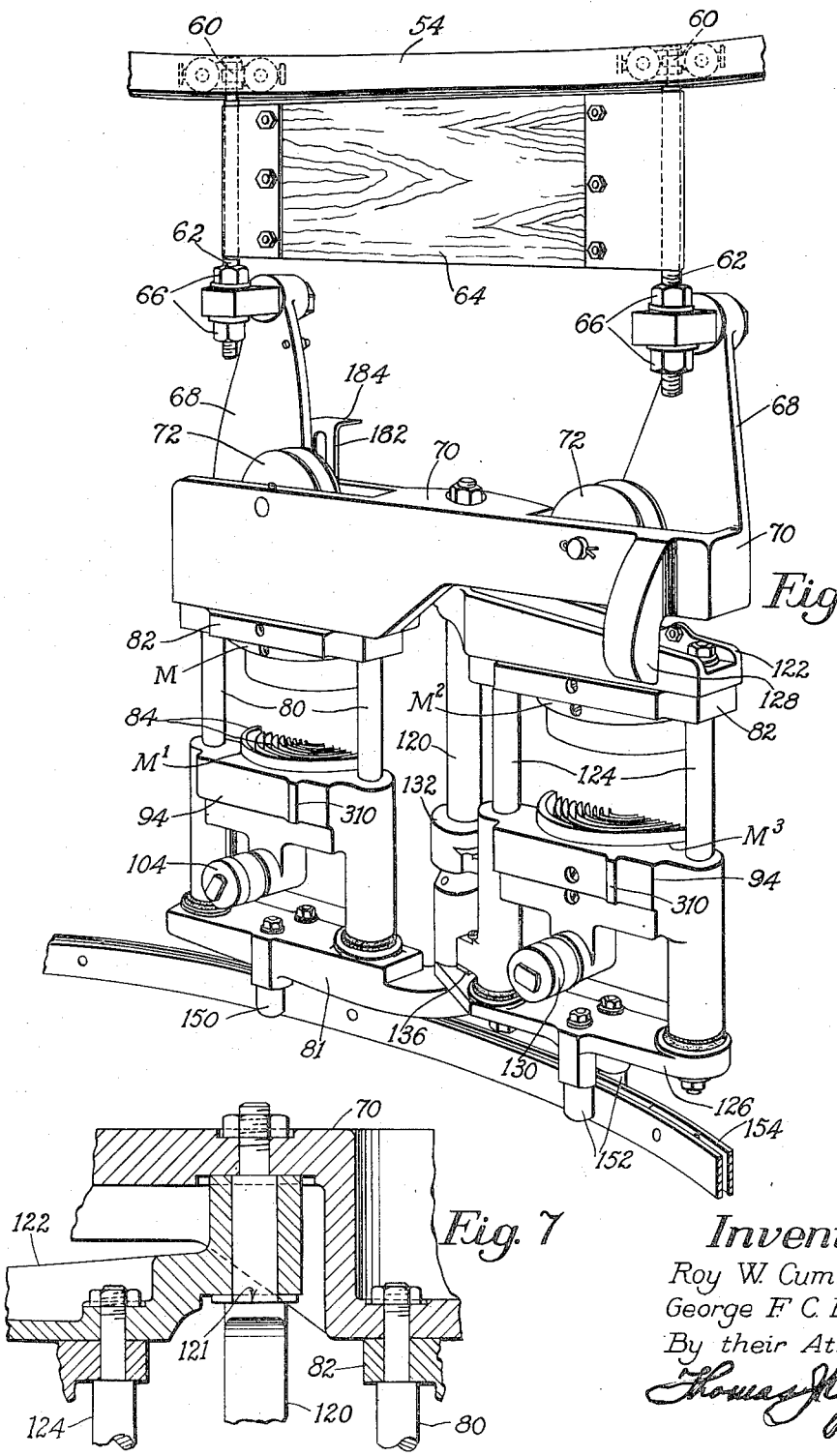

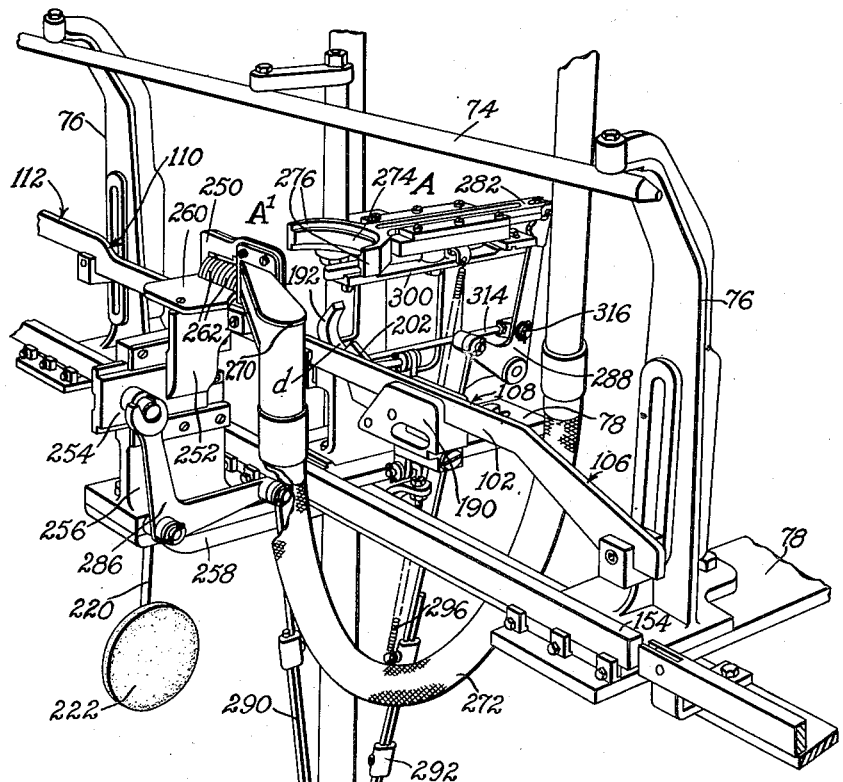
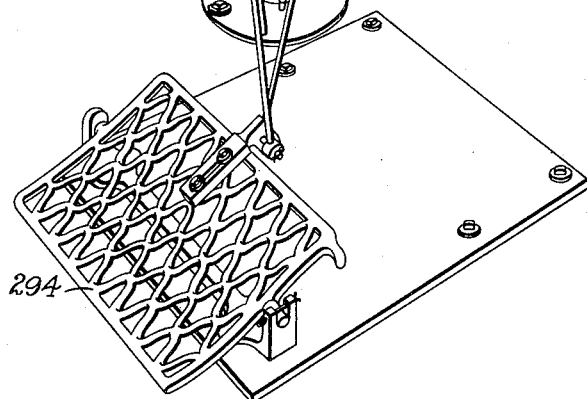
Fig. 11

Inventors
Roy W. Cummings
George F. C. Burke
By their Attorney
Thomas Ryan

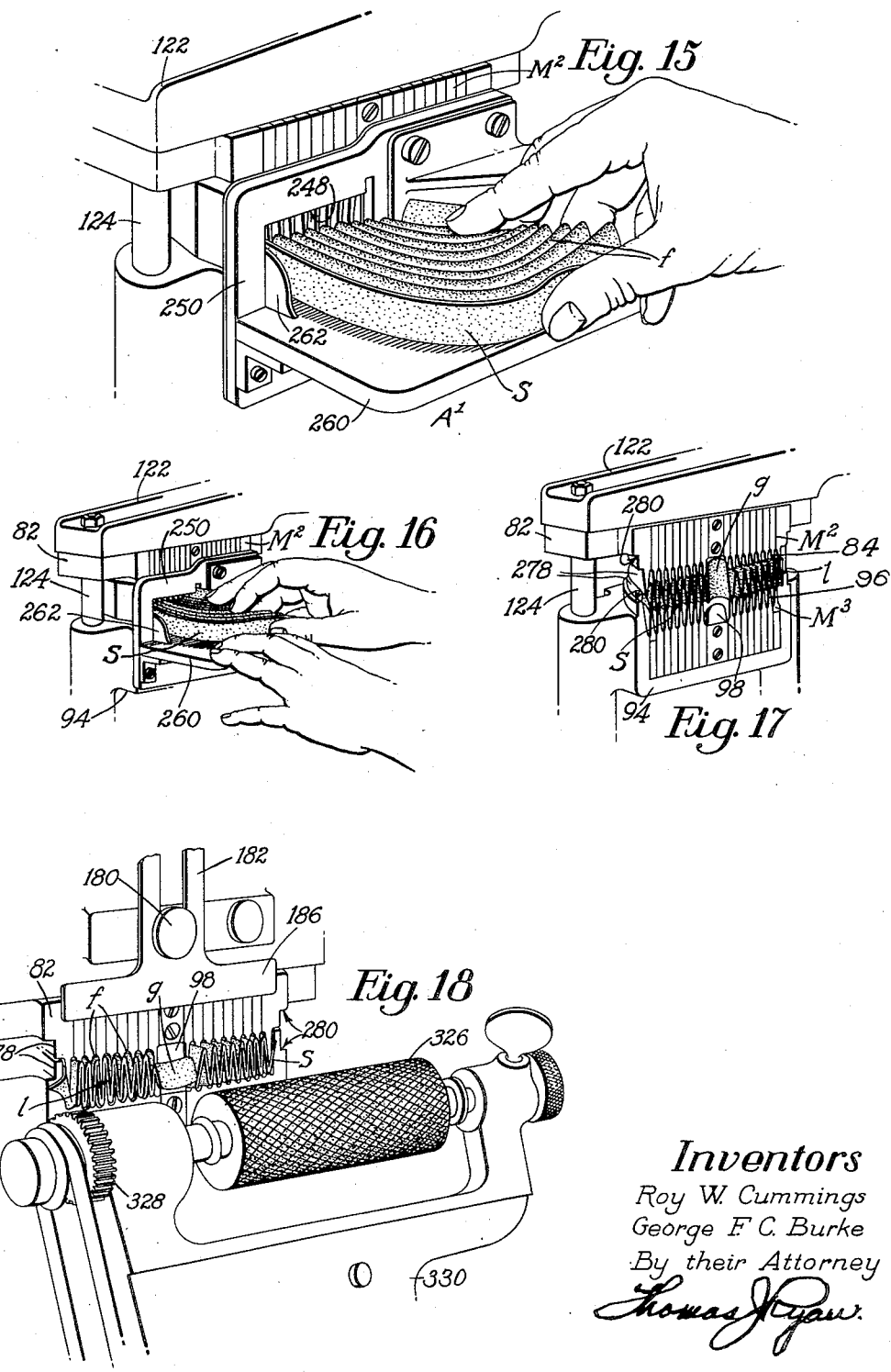

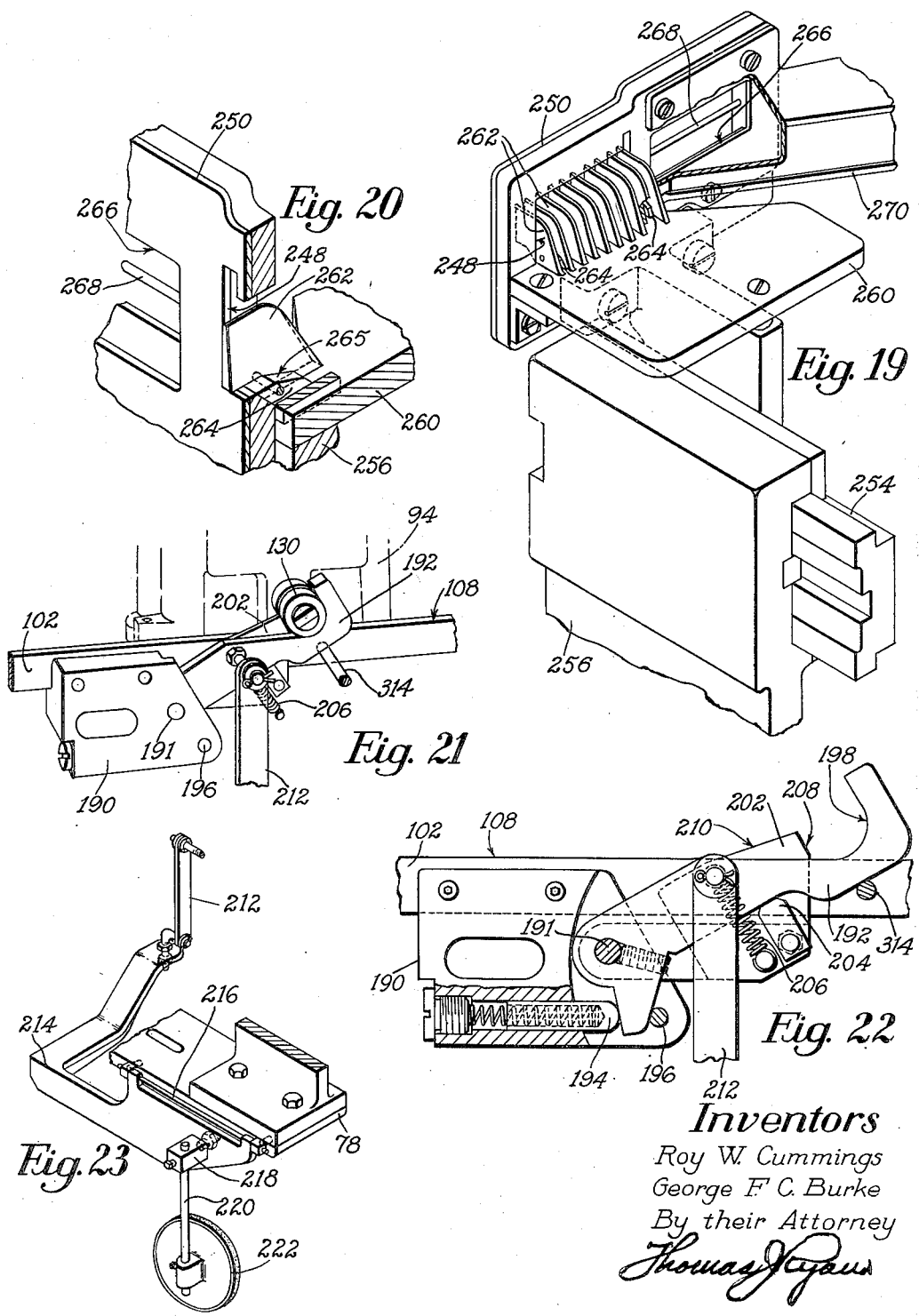

Inventors
Roy W. Cummings
George F. C. Burke
By their Attorney
Thomas J. Yaw

Inventors
Roy W. Cummings
George F. C. Burke
By their Attorney
Thomas J. Ryan.

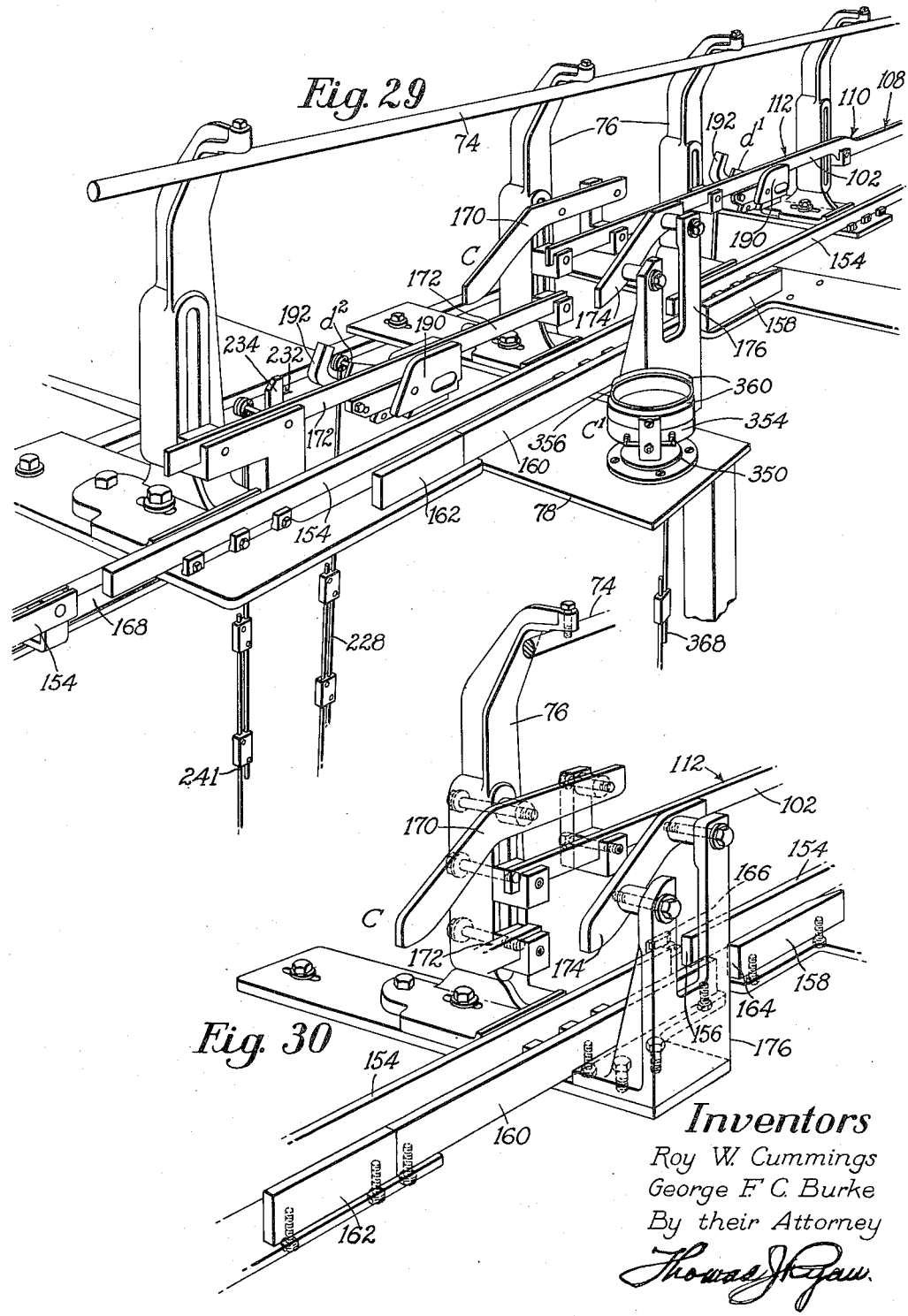

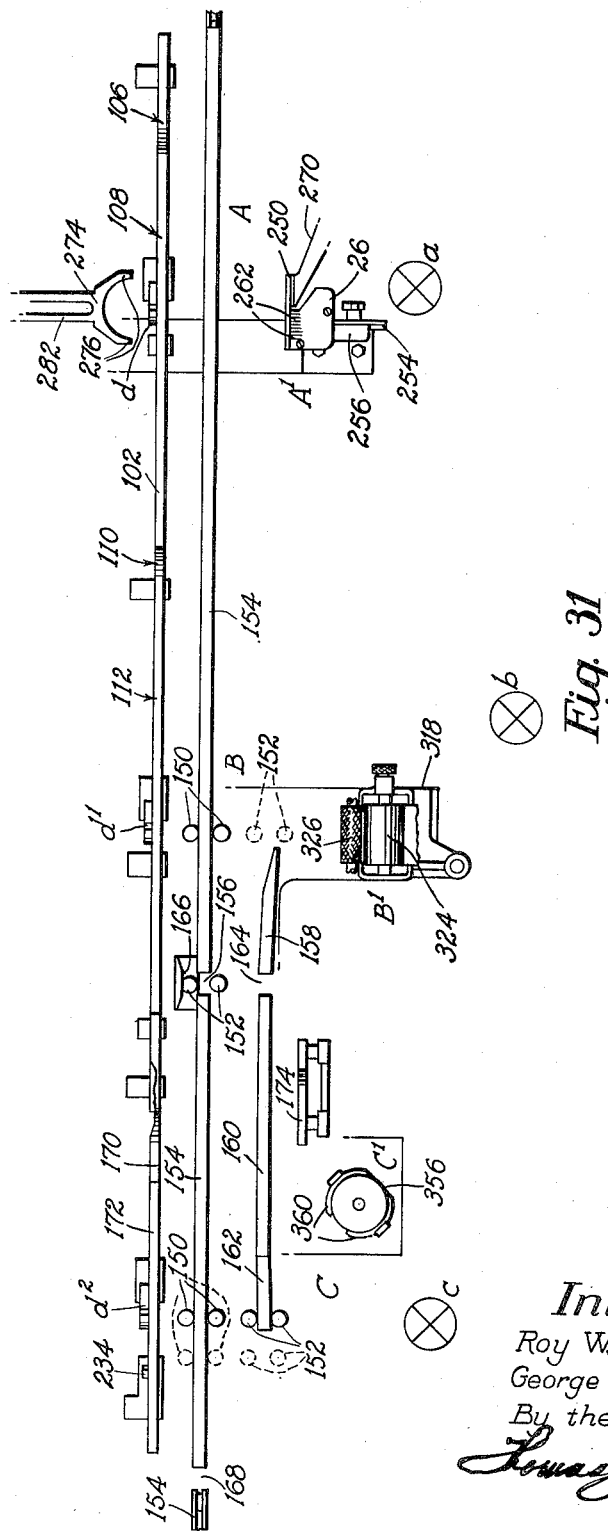

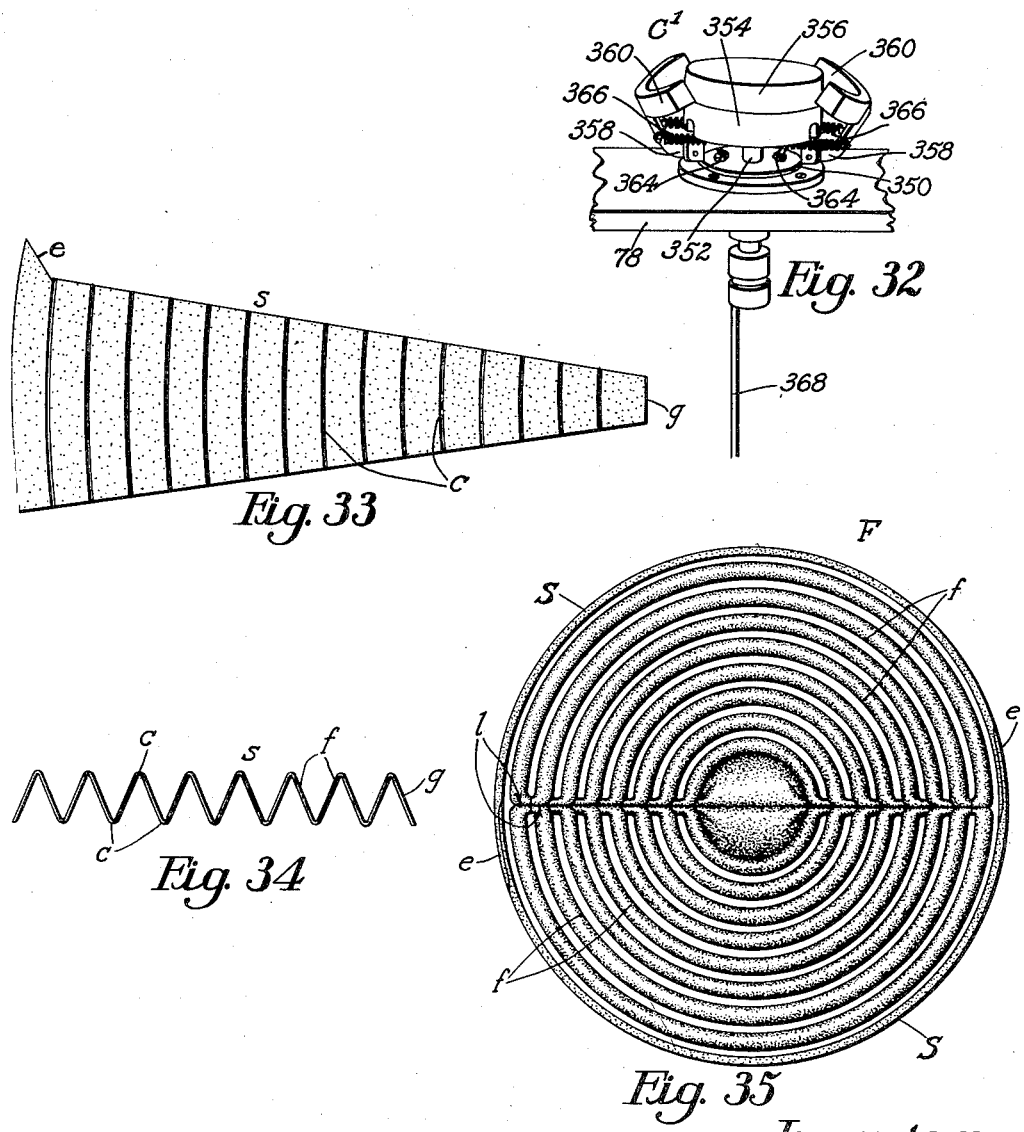

Patented Nov. 28, 1950

2,531,555

UNITED STATES PATENT OFFICE 2,531,555

ARTICLE-FORMING SYSTEM

Roy W. Cummings, Beverly, and George F. C. Burke, Fairhaven, Mass., assignors to United Shoe Machinery Corporation, Flemington, N. J., a corporation of New Jersey Application May 3, 1946, Serial No. 667,218

51 Claims. (Cl. 93—1)

This invention relates to the formation of various articles, it being especially applicable to the production from sheet-material of filters for gasmasks.

A known type of filter is made from blanks of a thin and relatively frail material, such as paper, which is folded into corrugated sections, a plurality of these sections being joined to furnish a filter. It is an object of this invention to so operate upon the blanks that the filters may be produced with great efficiency and at a very rapid rate, while maintaining the filtermaterial against injury tending to impair its efficiency.

A feature of the invention by which the above object may be attained may be found in a method of forming sheet-material, in which a pair of molds is positioned to furnish passages for the reception of a blank of material, the blank preferably being partially folded and introduced into the passages and then the molds pressed toward each other to form the blank. The introduction of the blank may be facilitated, and the necessity for applying undue pressure avoided, by the application to the ends of the passages opposite those receiving the blank of a force, as suction, which completes the introduction. The formation of the filter, or other article, is preferably effected by the operation upon a blank or blanks in a series of steps performed at stations through which the molds travel and at which they are successively stopped. These operations may include the assisted introduction of the blanks between the molds; the application of an adhesive to blanks formed in the molds into filter-sections in preparation for joining; the bringing the coated surfaces together to join the formed blanks or sections in the pairs of molds; the separation of the molds of both pairs, this separation being best successive; the removal of the joined filter-sections from the molds; the cementing to each filter-section of a lap with which the companion-section is provided; and the separation of the pairs of molds in preparation for the reception of other blanks. As the molds are advanced for the successive operations, other operations are performed upon the traveling blanks. These may include the preliminary bringing of the molds into position to receive the blanks; the pressing of the molds toward each other to form the introduced blanks; the pressing of the pairs of molds toward each other to cause coated portions of the formed blanks to adhere; the relieving the pressure applied between said formed and coated blanks; and the separating of the molds to free the formed filter for removal.

Another feature of the invention involves a system made up of instrumentalities by which our improved method may be performed. The more essential elements of the system are provided by a mechanism in which molds are mounted upon a carrier for movement relatively to each other and having a series of walls adapted to intermesh with each other, these furnishing passages for the introduction of a blank of material to be formed. For the formation of a sectional article, as a filter, two pairs of molds are so mounted that they are movable between positions in alinement with each other and in parallelism, as by the pivoting of one of the pairs upon the carrier, the molds of both pairs being movable relatively into and out of active cooperation with each other. In the alined relation, the blanks may be introduced between the molds of both pairs and formed by the relative movements of the molds of each pair and portions coated with an adhesive. In the parallel relation, the formed blanks are pressed together by relative movement of the pairs of molds for their joining and are released for removal by the separation of the molds. In the system, the carrier for the molds is movable upon a track, and rails extending along the track have portions which effect changes in the relation between the pairs of molds and the molds of each pair, as already outlined in connection with the performance of the method. Separate rails, which may be in part in sections, produce the forming pressure upon the blanks, the joining pressure between the formed blanks, and the separation of the molds to free the blanks for removal. In the movement of the mold-pairs between alinement and parallelism, the pivoted pair receive the support of means associated with the pivot, after it has left the rail which has produced the forming pressure. The support may be provided with a yieldable portion, which permits the separation of the molds of the pair. The rail for applying forming pressure to the molds is preferably engaged by projections from the lower molds of both pairs, while those rails which cooperate in the application of joining pressure are engaged at opposite sides by projections from the mounting of the mold-pairs. To permit, without interference, the movement of the pivoted pair of molds, the latter rails have spaces through which the projections may pass. At one of the plural stations along the track, to which the carriage presents the molds in predetermined positions controlled by stops releasable by an operator, there is mechanism by which a blank is drawn between the molds in preparation for its formation, the drawing force being preferably exerted by suction applied through the passages between the molds. The drawing mechanism includes means for facilitating the entrance of a blank into the mold-passages and its movement therethrough. So they shall not interfere with the travel of the molds upon the track, the suction means and its associated elements are movable into and out of their active positions, and there is herein disclosed means for preventing injury to such elements by locking them against movement in their inactive positions for release under the control of the molds in their movement. Further, there is a latching or stop device for retaining the molds in cooperation with the drawing mechanism, this device being locked in its retaining relation by a member which is moved to release said device by connection to an operator-actuated member through which the drawing mechanism is moved between its positions.

The herein-disclosed mechanism by which a coating of adhesive is applied to the filter-sections, is made the subject of an application for Letters Patent filed in the United States Patent Office on February 4, 1946, in the names of John M. Whelton and George F. C. Burke, and bearing the Serial No. 645,416; while the filter-holder for lap-cementing is the subject of an application filed August 16, 1944, in the name of George F. C. Burke, with the Serial No. 549,778, now Patent No. 2,432,137, issued December 9, 1947.

In the accompanying drawings illustrating one of the many possible embodiments of our invention, Fig. 1 shows in perspective the complete article-forming rink;

Fig. 2 is a perspective view of an entire mold-assembly, open and viewed from the outside of the rink;

Fig. 3 shows in end elevation the means for supporting the molds upon their track;

Fig. 4 is an enlarged detail in vertical transverse section through one of the lower molds;

Figure 1:
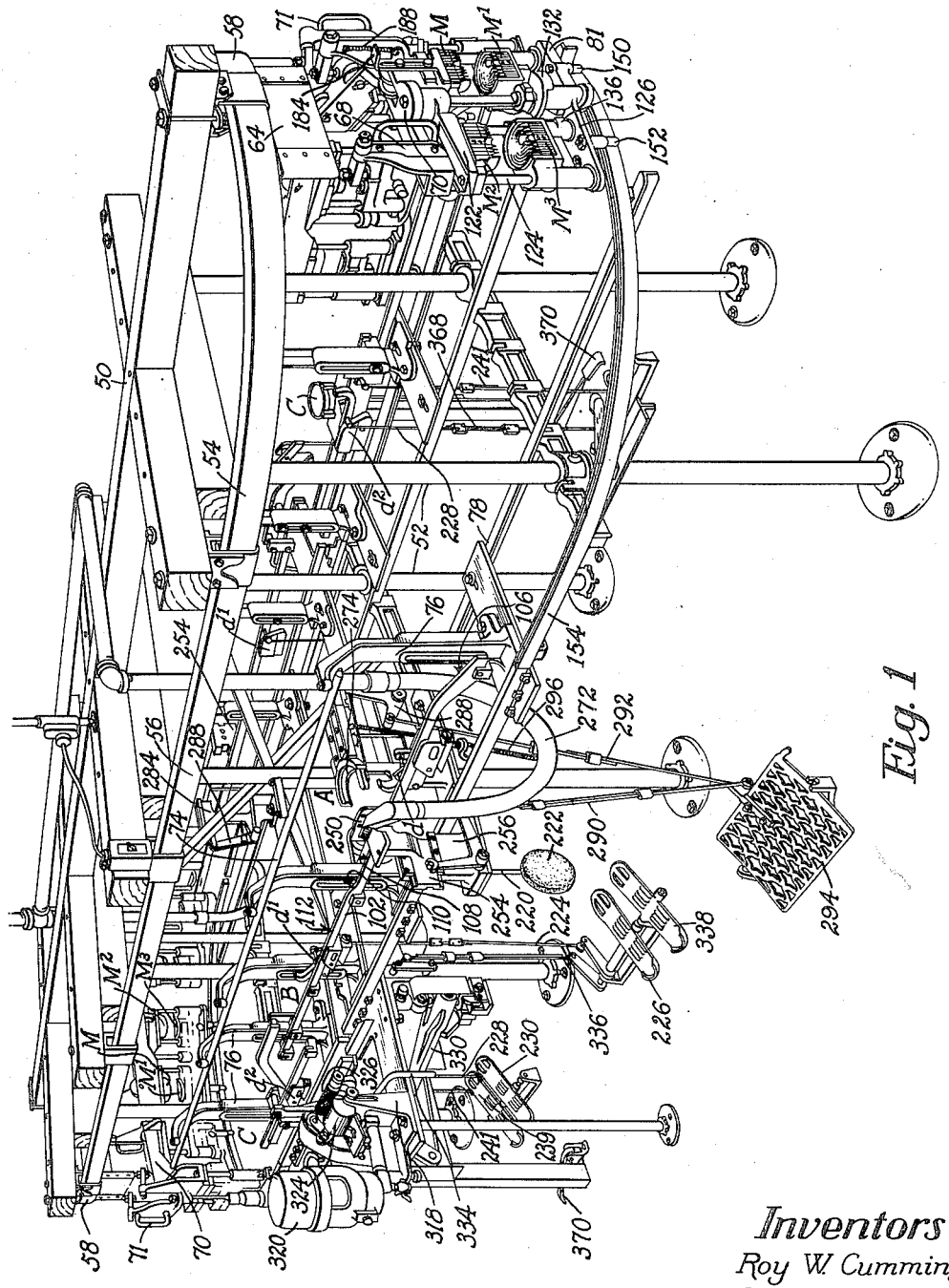
Figure 8:
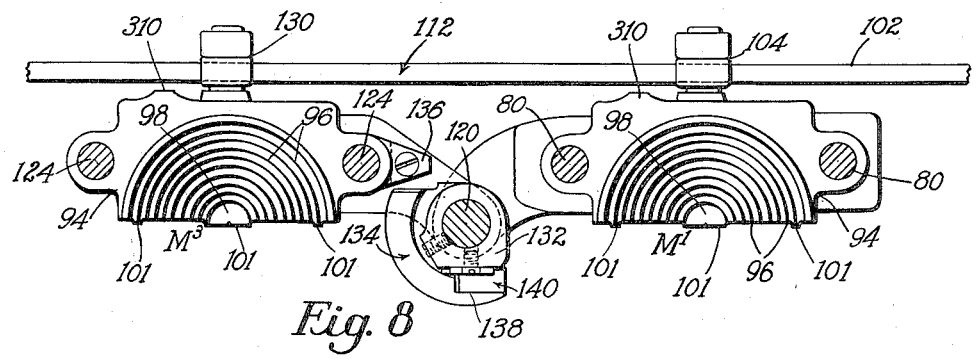
Figure 9:
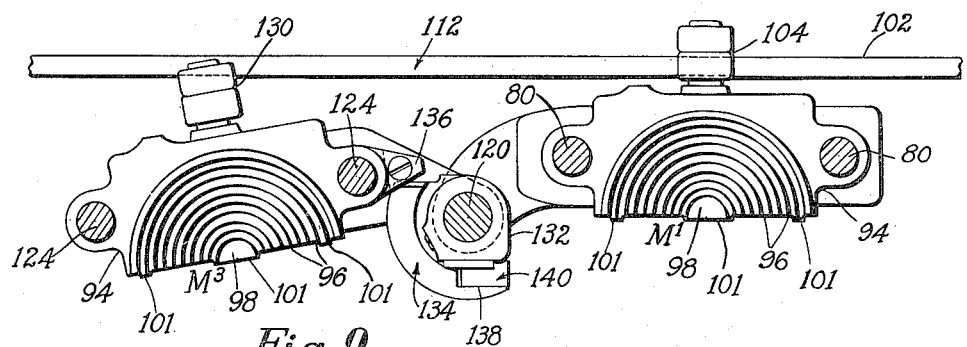
Figure 10:
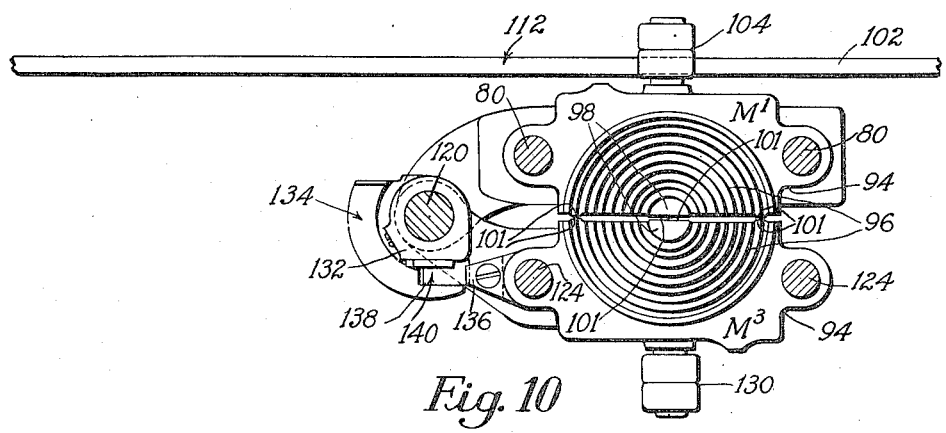
Figure 12:
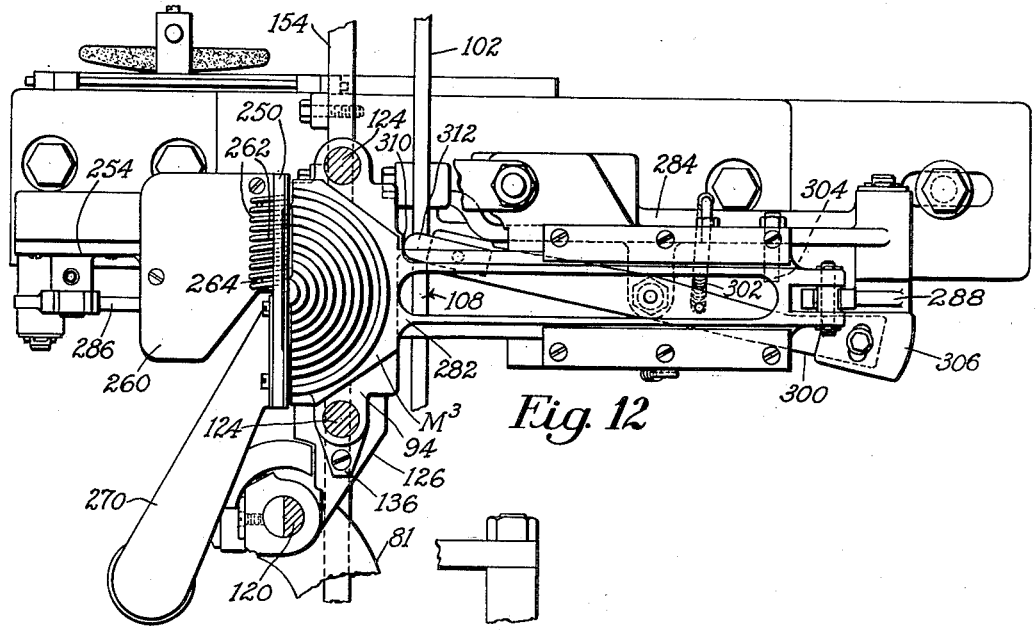
Figure 13:
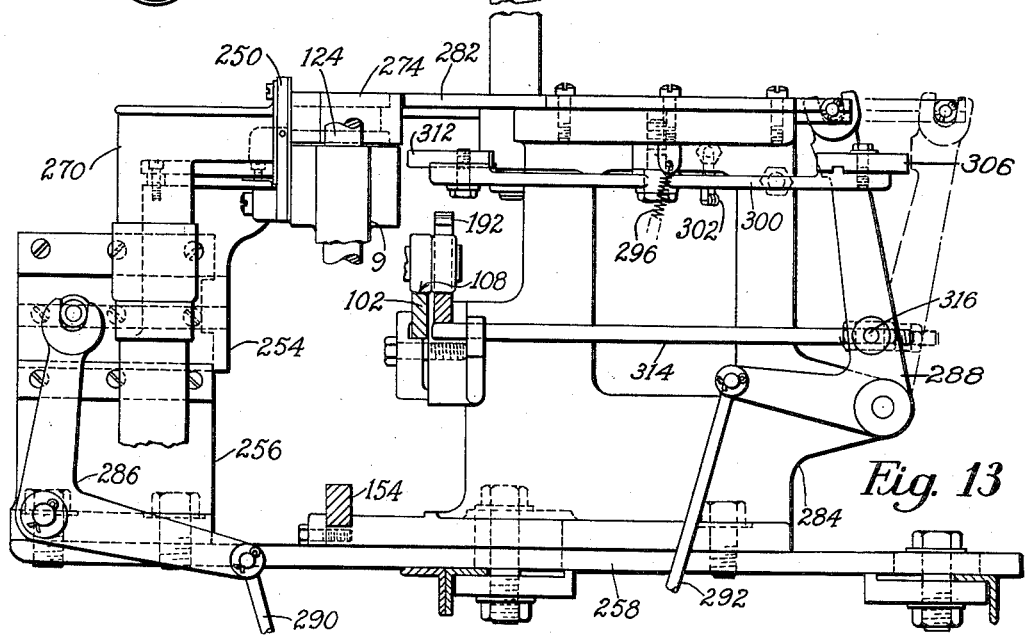
Figure 14:
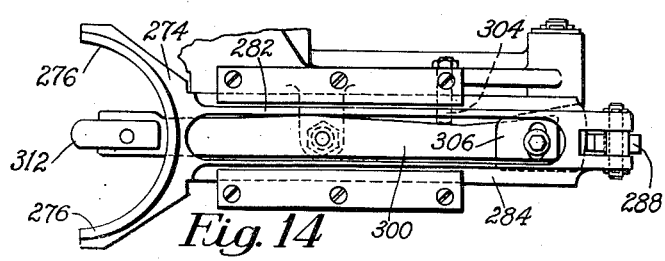
Figure 24:
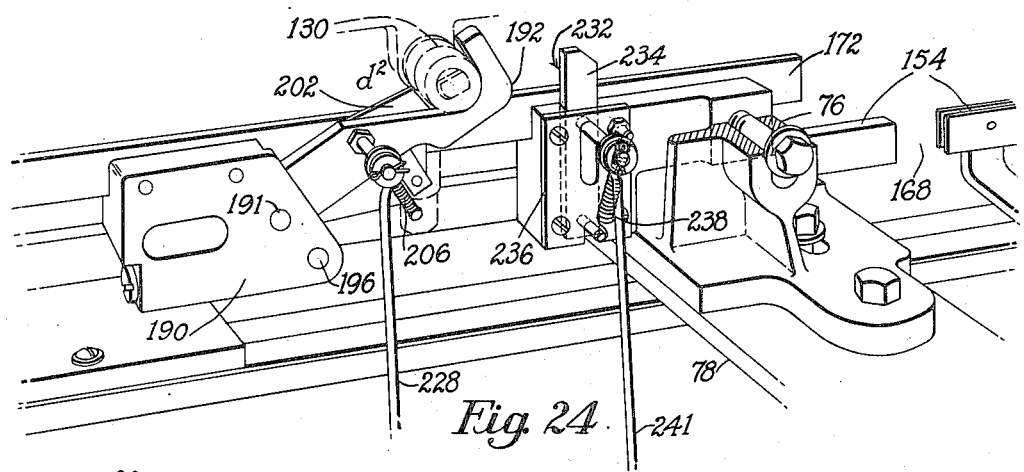
Figure 25:
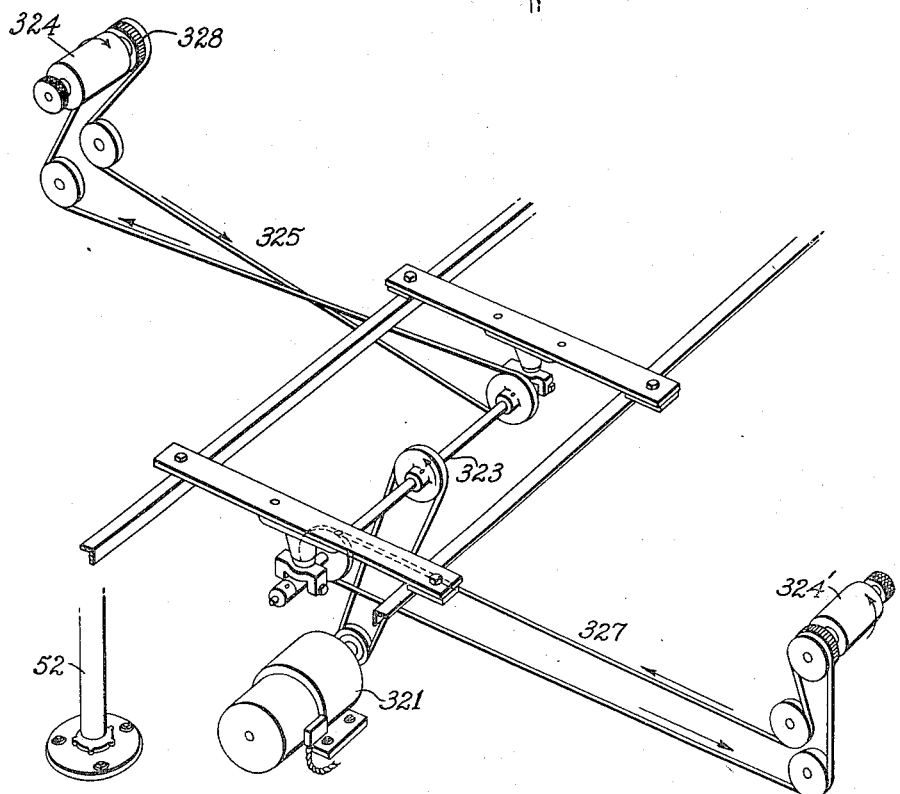
Figure 26:
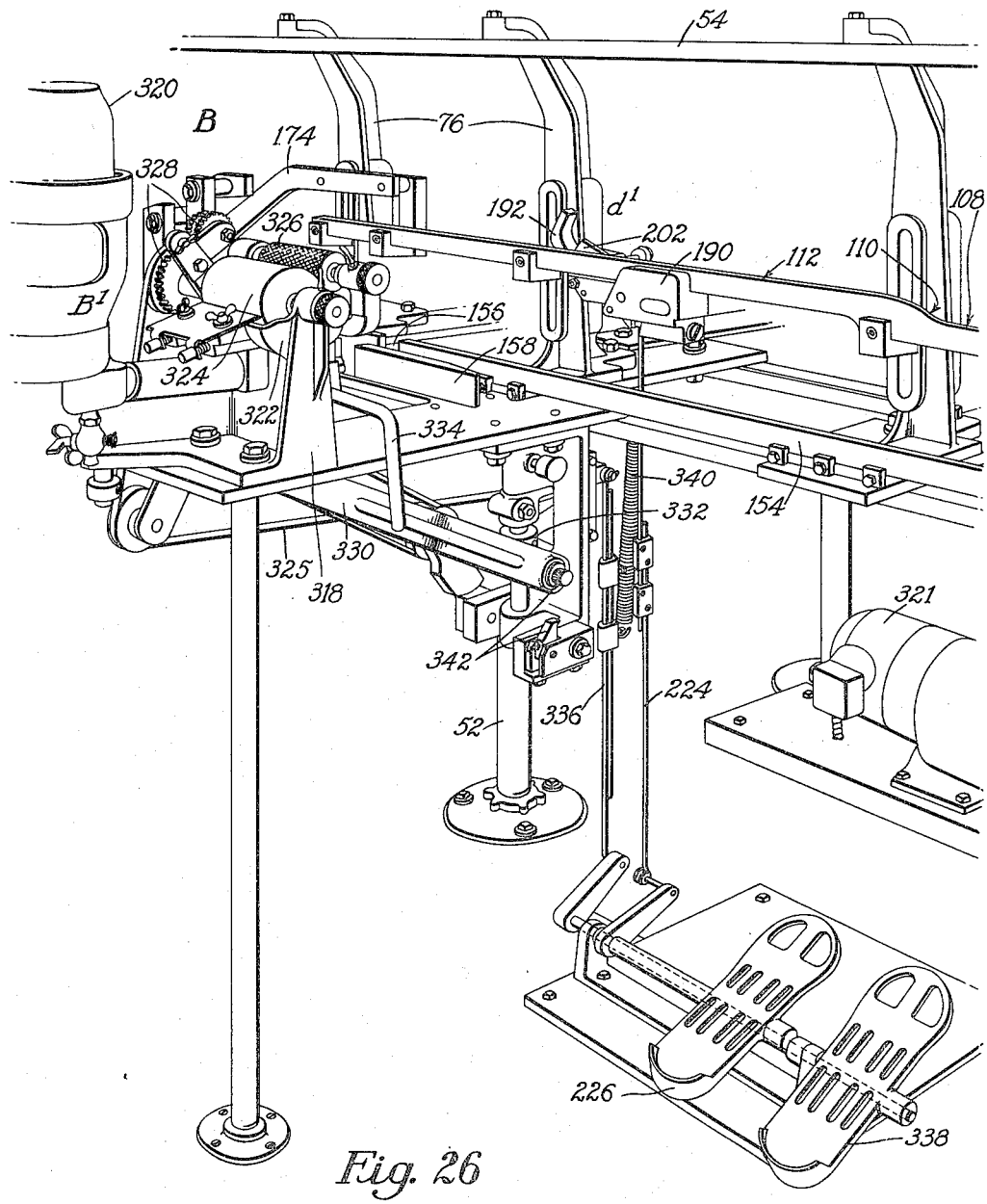
Figure 27:
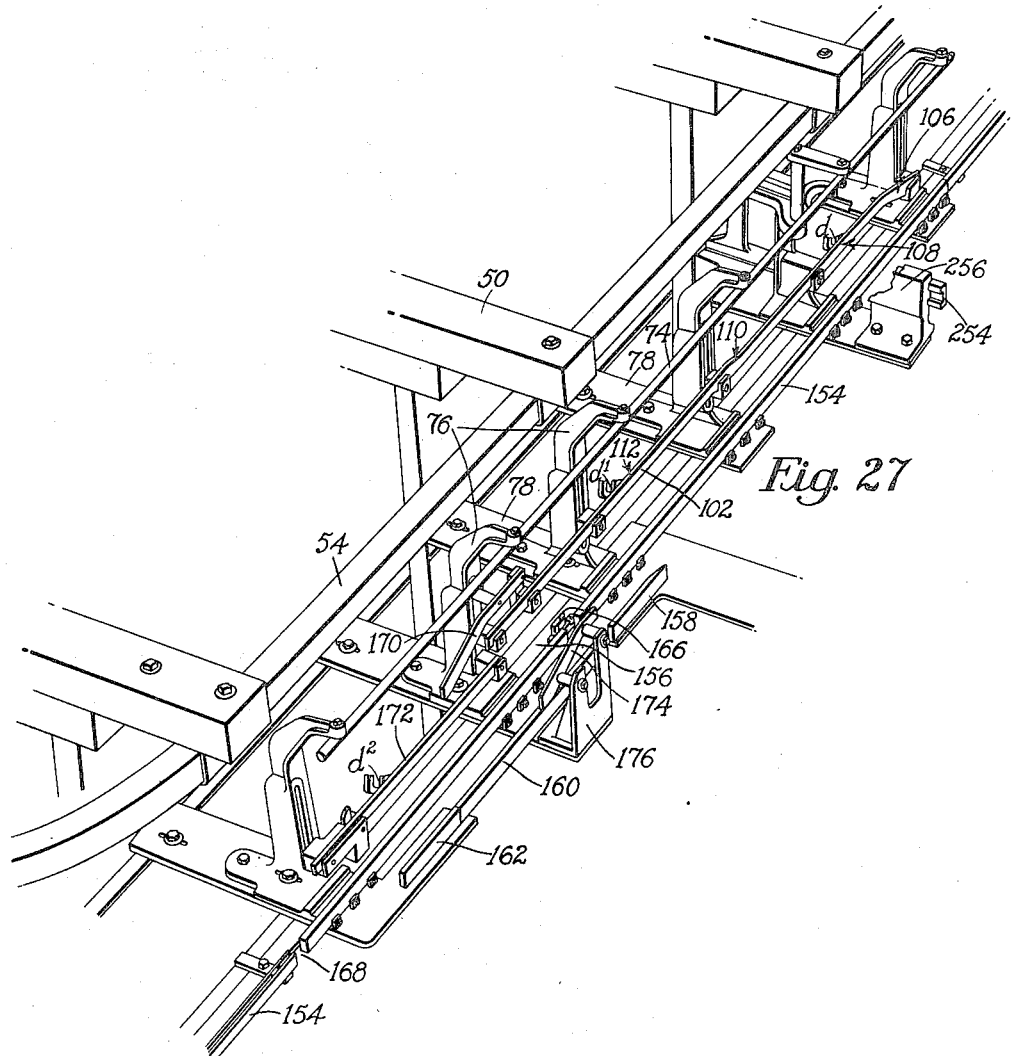
Figure 28:
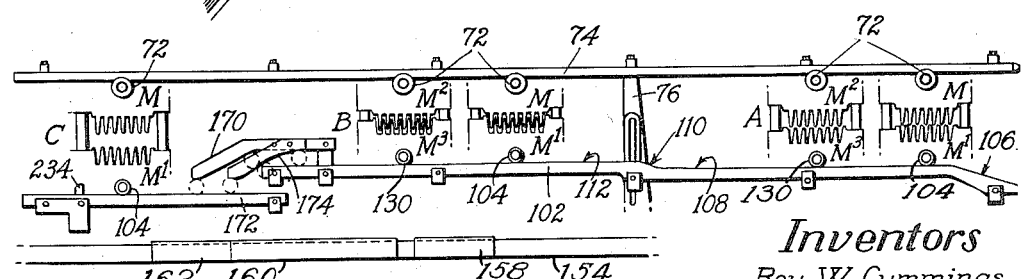

Fig. 5, a broken front elevation of a supporting device for the pivoted mold-pair;

Fig. 6 is a perspective view of the molds from the side opposite that of Fig. 2;

Fig. 7, a sectional detail through the pivotal connection between the mold-pairs;

Figs. 8, 9 and 10 are fragmentary top plan views of the lower molds, with the pivoted mold in successive positions;

Fig. 11 illustrates in perspective the mechanism for loading the molds;

Fig. 12 is an enlarged top plan view of said mechanism;

Fig. 13 shows the loading mechanism in side elevation;

Fig. 14 is a top plan view of the mold-closing wall at the loading mechanism, together with the more closely associated elements;

Fig. 15 illustrates in perspective the first step of introducing a partially folded filter-blank into the loading mechanism;

Fig. 16 similarly illustrates the further introduction of the blank;

Fig. 17 is a like view, showing the blank fully in place between the molds;

Fig. 18, a perspective view of the molds, with the blank as it appears ready to receive the application of cement;

Fig. 19, a perspective view of the entrance portion of the loading mechanism;

Fig. 20, a broken detail in perspective of some of the elements of Fig. 19, viewed from the rear;

Fig. 21, a perspective view of one of the mold-latching devices, viewed from the rear;

Fig. 22, an enlarged broken rear elevation of this latching device;

Fig. 23, a perspective view of the latch-releasing means at the loading station;

Fig. 24, a like view of the latch and stop means at the unloading station, viewed from the rear;

Fig. 25, a perspective view, diagrammatic in character, of the driving means for the blank-coating mechanism;

Fig. 26, a perspective view of said coating mechanism;

Fig. 27, a perspective view of a portion of the track and rails along which the molds are advanced, viewed from the left in Fig. 1;

Fig. 28, a diagrammatic side elevation of the rails and the molds in successive positions;

Fig. 29, an enlarged perspective view of the rails and associated devices at the unloading station;

Fig. 30, a like view, particularly illustrating the overhead mold-separating rails;

Fig. 31, a diagrammatic plan of the apparatus at one side of the rink;

Fig. 32, a perspective view of the filter-holder at the unloading station;

Fig. 33, a top plan view of a blank from which a filter may be formed;

Fig. 34, a side elevation of the blank, partially folded in preparation for introduction into the loading mechanism; and Fig. 35, a top plan view of a completed filter.

To consider first an article for the forming of which the present system is particularly adapted, this being a filter F (Fig. 35) for use in such devices as gas-masks, it may be of some such porous material as paper and consist of two sections furnished by equal segments S, S, each formed from a sector-shaped blank $s$ creased at $c$ along arcuate lines (Fig. 33). Each blank is folded in a series of folds or plaits $f$ of gradually decreasing radii. The two filter-sections are joined at their common diameter by such a cement as latex, there being at one end of the outer fold of each section a reinforcing extension or lap $e$ which overlies and is cemented to the outer wall of the other section. There results a thin cylindrical body, the successive folds of which present a relatively great filter-area for the space occupied. This filter may be placed within the can of a gas-mask and clamped by a ring engaging the inner side of the outer folds. Obviously, in the formation of the folds, the filter-material must not be broken or greatly compressed or stretched, and the joints between the ends of the section-folds must be unbroken.

The elements which we employ for direct engagement with the blanks to effect their formation preferably consist of two pairs of mating molds M, M¹ and M², M³ (Figs. 2 and 6), the pairs acting simultaneously to press two blanks $s$, $s$ into the folds $f$. The pair of molds M², M³ is so pivoted that it may be positioned in alinement with the companion-pair M, M¹ (Figs. 2, 6 and 8) for the reception of the blank, or swung parallel to said companion-pair for the joining of the formed sections S, S (Figs. 9 and 10). Carried by a conveyor-system, a plurality of the double pairs of molds, providing mold-assemblies, are advanced through a rink made up of one or more series of stations, at which stations successive operations are performed by operators upon the work. The travel of the molds through the rink is produced successively by the operators to advance them from station to station. At a loading station A (Figs. 1 and 11), the two pairs of molds, which arrive separated to the maximum extent, are automatically partially intermeshed to receive in two successive positions the blanks to be formed (Figs. 15, 16 and 17). The introduction of the blanks to the molds by an operator at $a$ (Fig. 31) is aided by suction mechanism $A^1$. In traveling to the succeeding coating station B, one mold of each pair is moved toward its companion, as a result of its advance, to apply forming pressure to the blank, and, with the blanks still under pressure, the operator at $b$, by actuation of the coating mechanism $B^1$ applies cement simultaneously to the end-surfaces $l$ of the folds $f$ at the diameters of both sections S. Having thus coated the two sections, the operator $b$ turns the molds $M^2$, $M^3$ opposite the molds M, $M^1$ about their pivot, to bring the coated surfaces of the two filter-sections together. As the molds travel on, the sections are held under the vertical forming pressure, and lateral pressure is also applied automatically to urge the molds $M^2$, $M^3$ toward the molds M, $M^1$ to cause the cemented surfaces to be joined. In the further advance of the molds to an unloading station C, the filter-sections are relieved of the forming force, the molds $M^1$, $M^3$ being lowered automatically from the sections M, $M^2$, and the molds $M^2$, $M^3$ are similarly freed from the lateral joining pressure. An operator $c$ at station C removes the joined filter-sections from the molds and places them upon a holder $C^1$, while the lap $e$ of each section is cemented manually to the companion-section. This is effected in one position of the entire mold-assembly, and in an adjacent position the operator returns the molds $M^2$, $M^3$ to alinement with the molds M, $M^1$ and may forward them to another series of operators in the rink for use in the production of another filter.

To support the molds and to guide them from station to station, there appears in Fig. 1 of the drawings a top-frame 50 supported upon posts 52 and having suspended from it a double track 54, generally of inverted U-form (Fig. 3). As illustrated, the track is arranged to serve a rink comprising two series of operating positions, the two series being arranged along opposite straight portions 56, 56 of the track connected by curved portions 58, 58. Along the straight runs of the track, the respective series of operating stations A, B and C are located, the curved portions merely permitting the transfer of the molds between the two series. Referring to Figs. 2, 3 and 6, upon the tracks 54 run pairs of double-wheeled trolleys 60, 60, from each of which depends a rod 62. The rods of each pair are connected and spaced from each other by a plate 64 to form, with the trolleys, a wheeled carriage. The lower portions of the rods are threaded, and upon them, by pairs of nuts 66, 66, are clamped arms 68, 68 rising from a mold-carrier 70. A handle 71 on one of the arms facilitates the manipulation of the carriage by the operator. Rotatable upon the carrier is a pair of grooved rolls 72, 72, arranged to contact with an overhead rail 74 supported upon overhanging standards 76 carried by lower frame members 78 at each side of the apparatus parallel to the track-portion 56. The rolls 72 resist displacement of the molds when upward forming pressure is applied to them. Extending downwardly from the rear half of the carrier, considered in the direction of operating travel, are parallel rods 80, 80 connected at the bottom by a crossbar 81. Between the under face of the carrier and shoulders upon threaded extremities of these rods (Fig. 7) is clamped, by nuts upon the rods, the flange of a holder 82 belonging to the mold M. The holder contains a series of concentric arcuate walls or ring-sections 84, each of which is semi-circular, these walls being equally spaced from the adjacent walls and gradually decreasing in radius from an inner concave abutment 86. Through openings in the holder-wall and alined openings in the sections extend headed pins 88 (Fig. 4). Screws 90 pass through openings in the abutment registering with the pins, and are threaded into said pins, maintaining all the elements of the mold in fixed relation. This retaining arrangement may be similar for all the molds. Each of the rings tapers outwardly from a body-portion 92, through which pass the pins 88, to a slightly rounded point. Guided to slide upon the rods 80 is a lower holder 94, in which, similarly to the mold M, are clamped the wall-sections 96 of the mold $M^1$. As may be seen in Figs. 17 and 18, the sections 84, 96 intermesh symmetrically and are adapted first to receive between them and then to enter alternately the successive folds $f$ of a blank. A center abutment 98 has a convex surface complemental to the concave surface of the abutment 86, these acting upon the inner complete fold of the blank, while the small end $g$ of the blank (Fig. 33) overlies a vertical surface 100 of the abutment 98. As appears in Figs. 8 to 10, the opposed surfaces of the center abutments and of the outer ring-sections project at 101 somewhat beyond the planes of the intermediate ring-sections. This produces greater joining pressure (Fig. 10) between the projecting filter-surfaces $l$, $l$ at the more critical points. When the mold $M^1$ is raised to act with the mold M upon a blank introduced between them, said blank will be pressed into the concentric folds $f$, as they appear in Fig. 18, the size of the blank being such that it projects somewhat from the diameter of the mold-sections for the reception of a coating of cement. This elevation of the mold $M^1$ is effected by a rail 102 (Fig. 1) attached to the standards 76 and engaged at its upper edge by a roll 104 rotatable at the bottom of the lower holder 94. The rail has a cam-incline 106 which the roll engages as the molds arrive at the rail, this incline elevating the lower mold from the fully separated position of Fig. 2 to the partially meshed relation of Fig. 17, for the introduction of a blank while it is temporarily held by a horizontal surface 108 of the rail. See also the diagram of Fig. 28. A succeeding cam-incline 110 upon the rail brings the roll 104 upon a second horizontal rail-surface 112 with the blank under clamping pressure, as may be seen in Fig. 18.

The pair of molds $M^2$, $M^3$ is so arranged that it may be alined with the pair M, $M^1$ along the run 56 of the conveyor-track (Fig. 8) in a position for the introduction of a blank at mechanism $A^1$, for the work-pressing action of the rail 102 and for the coating action of the mechanism $B^1$, or may be brought into parallelism with the pair M, $M^1$ (Fig. 10) to effect the adhesion of the cemented diameters of the filter-sections and for the removal of the filter at station C. To permit this movement of the molds $M^2$, $M^3$, they are pivoted upon the carrier 70 about a vertical rod 120 set in said carrier and in the bar 81. These molds may themselves be identical with the molds M, M¹ and require no description, but the upper mold M² is attached to an arm 122 mounted to swing about the rod 120 upon a shoulder 121 (Fig. 7). Rods 124, upon which the holder of the lower mold M³ is slidable, join the arm 122 to a vertically alined arm 126 turning about the rod 120. A projection 128 from the carrier 70 limits the movement of these molds away from their companions. As long as the two pairs of molds are alined in the direction of travel, a roll 130 upon the holder of the mold M³, running upon the rail 102, maintains the desired vertical relation between this mold and the mold M². When, however, this roll leaves the rail as the hinged molds are swung into parallelism with the companion-pair (Fig. 9), this support is lost. To maintain the mold M³ in its raised relation during this movement, there is fast upon the rod 120 a bracket 132 having an arcuate horizontal surface 134 (Fig. 5). With the mold M³ in its raised pressure-applying position, a projection 136 from the arm 126 lies in a horizontal plane just above the surface 134. As the roll 130 leaves the rail 102 in the swinging of the molds M² and M³, the projection passes over the surface and is supported thereby (Fig. 9). Lying in a recess at the forward end of the surface 134 is a supporting member 138 pivoted upon the bracket 132 and with its surface 140 held yieldably in alinement with the surface 134 by a spring-plunger 142 movable in the bracket. When the molds M², M³ have reached their section-joining positions parallel to the molds M, M¹, the projection 136 will have left the surface 134 and will be above the surface 140 (Fig. 10). The force of the plunger will be sufficient to retain the mold M³ in mesh with the mold M² until the proper separating force has been applied to the roll 130. Then the support 138 yields against the plunger, allowing the mold M³ to descend.

At the under side of the bar 81 is a pair of transversely spaced rolls 150, 150 rotatable about vertical axes, and at the under side of the arm 126 is a similar pair of rolls 152, 152. The rolls 150 run along opposite sides of a rail 154 which extends throughout the lower portion of the rink, supported upon the frame-members. It follows a path similar to that of track 54 and serves to prevent lateral displacement of the mold-pair M, M¹. The rolls 152 engage the same rail when the mold-pair M², M³ is alined with the pair M, M¹ and similarly retain the former in position. The inner roll 152 may also pass through a space 156 in the rail when the rolls are at station B and the pair M², M³ is swung into section-joining coöperation with the pair M, M¹ (Fig. 31). Then, as the entire roll-assembly is advanced toward station C, the rolls 152 assume positions for their travel at opposite sides of a pressure-rail having successive sections 158, 160 and 162 (Fig. 27). The section 158 is inclined inwardly toward the rail, this convergence forcing the filter-section contained in the molds M², M³ against that in the molds M, M¹ to produce their adhesion after they have been cemented. The section 160 may parallel the rail 154 to hold the filter-sections for a time under joining pressure. The section 162 diverges outwardly from the rail 154 to relieve the pressure in preparation for the discharge of the filter. Between the rail-sections 158 and 160 is a space 164 through which the inner roll 152 may pass as the molds are swung into parallelism. At the inner side of the space 156 is shown a fixed vertical wall 166, so separated from the adjacent ends of the two sections of the rail 154 that the inner rolls 152 and 150 may pass it, but guarding against the outer roll of the pair 150 being accidentally forced through the space 156 as the operator at station B pushes the mold-assembly toward station C. In the rail 154, beyond station C, is a space 168 to pass the inner roll 152 as the mold-pair M², M³ is restored by the operator to alinement with the pair M, M¹ for advance to the opposite side of the rink.

During the travel of the molds along the rail-section 160, after the cemented filter-sections have been caused to adhere by the lateral pressure, the molds M¹, M³ are lowered in preparation for the removal of the filter from the companion-molds. Vertically alined with the rail 102 is an overhead cam-rail 170 supported upon one of the brackets 76, it first paralleling the rail 102 for a short distance and then being inclined downwardly and forwardly toward a rail 172, which forms a continuation of the rail 102 at a lower level (Figs. 27 to 30). The lower inclined edge of this cam-rail 170 lies in the path of the roll 104 of the mold M¹. An overhead cam-rail 174 supported upon a standard 176 is formed similarly to the rail 170 and is located at one side of the pressure-rail-section 160, its incline being somewhat to the rear of the rail 170. This rail 174 is in position to be engaged by the roll 130 of mold M³ when this is in the filter-joining relation. As the rolls 130 and 104 successively strike the inclined edges of the rails 174 and 170 respectively, the mold M³ is first cammed away from the mold M², the member 138 which has been supporting it yielding. Then the mold M¹ is similarly acted upon. This results in the lower portions of the formed filter being freed from the lower molds, and, since the upper molds offer twice the frictional resistance to displacement of the filter that does either of the successively lowered molds, said filter is unfailingly held by the upper molds for convenient removal by the operator at station C. To facilitate this removal, there is mounted to slide upon the inner face of the mold M in the space into which the filter-folds project, and guided by headed studs 180, 180, a slide 182 (Fig. 2). This slide has at its upper end a finger-piece 184 and at its lower extremity a horizontal extension 186 adapted to engage a filter along substantially its entire diameter. A tension-spring 188 holds the slide with the extension normally raised above the filter, but when depressed the slide strips said filter from the two upper molds, so its falls upon the lower molds in a position convenient for removal by the operator at station C. As may be seen from the full-line position of the rolls 152 in Fig. 31, the mold M², which contains one section S of the filter, cannot be separated from the mold M in which is the other section, because the hinged molds are still under the control of the rail-section 162, the inner roll 152 lying against the inner side of said rail-section. The filter, therefore, cannot be injured in this way. Carried to a position just beyond that for unloading the filter, the rolls 152 will be in the dotted-line position at station C, and the rolls are so located that the pair M², M³ may be turned back to a position determined by the projection 128 upon the carrier 70, one of the rolls passing through the space 168. The two pairs of molds are now alined, ready for forwarding to the opposite side of the rink, and held in alinement by the contact of the pairs of rolls 150, 152 with the opposite sides of the rail 154.

It is important that the molds be positioned accurately at station A for cooperation with the loading mechanism A¹, at station B for cooperation with the coating mechanism B¹ and with respect to the rail-spaces 156, 164, and at station C first as to the end of the rail-section 162 and second as to the rail-space 168. To accomplish this, the following means is provided: At each of the stations A, B and C are stop devices d, d¹ and d², respectively (Fig. 1), more particularly shown in Figs. 21, 22 and 24. Attached to the inner side of the rail 102 at stations A and B, and also to the rail 172 at station C is a mounting plate 190 for each of the stop devices, in a recess in which is pivoted at 191 a hook-shaped primary stop or latch 192. This latch is normally raised by a spring-plunger 194 which holds a tail of the latch yieldably against a stop-rod 196. The depression 198 of the hook is adapted to receive and retain against advance either the roll 130 of the mold M³ or the roll 104 of the mold M¹. Pivoted at 191 with the primary latch is a secondary latch 202, consisting of a plate having fixed to it a stop-projection 204 which is drawn against the underside of the hook 192 by a tension-spring 206. This locates the edge 208 of the latch-plate at the rear of the hook-depression 198 to close this against a rearward movement of a roll which has entered it. At station A the roll 130 of the advancing mold-pair strikes an edge 210 on the plate 202 of the device d, forcing this down, the spring 206 yielding. The roll then is stopped by the hook 192 and is held against retraction by the plate which has risen behind it.

Connected to the latch 192 at station A is a link 212 (Fig. 23) joined to an angle-piece 214 pivoted to tilt about a horizontal rod 216 mounted upon one of the frame members 78. Fixed to the outer side of the angle-piece is a block 218 in which is secured a depending rod 220. To the lower portion of the rod a knee-pad 222 is fixed. The manner in which the block is attached to the angle piece and the rod to the block and pad makes it possible to adjust said pad to the position most convenient for the operator. Pressure upon the pad draws down the latches 192 and 202 together and permits the advance of the retained molds. Pressure is thereafter promptly removed from the pad, so the latches again rise for engagement with the roll 104 of the mold M¹. Thus, the two mold-pairs of the assembly are successively positioned to receive a filter-blank s at the mechanism A¹. To the latch d¹ at station B a rod 224 is joined, its lower extremity being connected to a treadle 226 (Fig. 26). With the latch raised, the complete mold-assembly is stopped by its successive engagement with the rolls 130 and 104 in such positions that the edges of both filter-sections S, S protruding from between the two pairs of molds may be coated by the operation of mechanism B¹. At station C, the latch d² is connected by a rod 228 (Fig. 29) to a treadle 230 (Fig. 1). When the molds are stopped in this position by engagement of the roll 104 with the hook 192 for the removal of a filter, they are so located that the opposed halves of said molds are held against separation by engagement of the rolls 150 with the rail-section 162 near its end. Upon depression of the treadle 230, the molds are released for advance until the roll 104 engages the vertical face 232 of a stop-slide 234 (Fig. 24), movable in a casing 236 attached to the sides of the rail-section 172 and held normally elevated above the rail by a tension-spring 238. This so retains the molds that the outer roll 152, now clear of the rail 162 in the dotted-line position of Fig. 31, may be swung through the opening 168, ready for advance to the opposite side of the rink when a treadle 239 connected to the slide by a rod 241 has been depressed.

Considering now the loading mechanism A¹ at station A, this is shown in Fig. 11 in relation to the system as a whole and in greater detail in Figs. 12 to 20. As has previously been explained, the pairs of molds M, M¹ and M², M³ arrive at the loading station A with their arcuate walls 96 and 84 partially intermeshed in blank-receiving relation. This is as appears in Fig. 17, after a blank has been introduced. The engagement of the roll 130 with the latch device d at this station stops the leading molds M², M³ with the forward half, or that in advance of the central abutments 86 and 98, opposite an opening 248 in a vertical wall 250 (Fig. 15) of the loading mechanism A¹. This wall rises vertically from the inner side of a bracket 252 (Fig. 11) fixed to a slide 254 guided in horizontal ways at the top of a standard 256 attached to the outer end of an extension 258 from a frame member 78. Extending horizontally from the opening 248 is a shelf 260 upon which the operator places a blank s partially folded in a preliminary way. To direct the folds of the leading end of the blank between the mold-walls, there extends outwardly from the opening 248 and upwardly from the shelf 260 a series of partitions 262 (Fig. 19) having their upper edges curved downwardly and outwardly. The partitions between those at the ends of the series register with the walls 96 of the lower mold and may be somewhat curved or inclined horizontally from their outer ends toward the opening at 248 (Fig. 12) to at least partially conform to the curvature of the walls of the molds. This facilitates the entrance of the blanks between the molds. Resting upon the shelf 260, between the outer pairs of partitions at the opposite ends of the series, is a block 264 provided with an upwardly and inwardly inclined surface 265 upon which the lower edges of the outer folds are laid upon the introduction of a blank. This elevates said blank sufficiently to remove it from contact with the shelf except over a quite limited surface, and thus reduces the frictional resistance to advance. In the wall 250 beside the opening 248 is an opening 266, across which is a horizontal stop-rod 268. Secured over the opening 266 is the nozzle 270 of an exhaust-conduit 272 (Fig. 11), the exhaust-producing means not being illustrated. As the leading end of a blank is advanced between the partitions through the wall-opening 248 and enters between the walls of the molds, there is applied to it, through the passages formed between the intermeshing mold-walls, the continuous pull exerted by the exhaust, which aids in drawing the blank rapidly into the passages and against the rod 268. This not only makes more prompt the introduction of the blank, but also guards against the operator forcing it forward so it might be deformed. To decrease losses of suction through the mold-passages by leakage at the rear of the molds, the space is closed by a wall 274 curved upon the same radius as the exterior of the holders 82 and 94 and having arcuate projections 276, 276 (Figs. 11 and 14), which, as the upper and lower molds are related during the loading of the blanks, will fit closely about mold-surfaces 278 and between shoulders 280 (Fig. 17).

The location of the stop-rod 268 and the length of the folded blank s with relation to the length of the passages between the arcuate walls of the molds, is such that when a blank is against the rod its ends project equally from the opposite extremities of the passages. Consequently, as the pairs of molds enter and leave station A, the outer wall 250, and the elements movable with it, must be withdrawn from the path of the molds, as must also the inner wall 274, to be carried to their effective relation when a pair is stopped by the latching device d at the station. As has already been pointed out, the wall 250 is mounted upon a slide 254. The wall 274 is formed upon the forward end of a slide 282 guided upon the horizontal top of a standard 284 rising from the frame-extension 258 (Figs. 12, 13 and 14). The two slides are normally held out of coöperation with the molds, but may be shifted in the following manner to the effective positions of the elements which they bear: Upon the standard 256 is fulcrumed a bell-crank-lever 286, and upon the standard 284 a bell-crank-lever 288. An upwardly extending arm of each lever is forked to engage a projection from the corresponding slide. Arms extending in a generally horizontal direction from the levers 286 and 288 are connected respectively by rods 290, 292 to a treadle 294 (Figs. 1 and 11). A tension-spring 296 associated with the rod 292 holds the treadle and both rods normally raised and the two slides in their inactive positions. Depression of the treadle by the operator, after the molds are in loading position at station A as determined by the device d, simultaneously moves the walls 250 and 274 into coöperation with the molds.

Were the operator to attempt to carry the molds to the loading position when the wall 274 was arranged for coöperation with said molds, or to advance them when they were surrounded by the wall, its outer ends 276 might be broken. Means is provided to guard against either occurrence. Fulcrumed upon the standard 284 beneath the slide 282, for movement horizontally, is a lever 300 which is normally drawn by a tension-spring 302 against an adjustable stop 304. This places a laterally adjustable contact member 306, attached to the rear extremity of the lever, in front of the upper end of the bell-crank lever 288 (see dotted-line position in Fig. 13). The lever, and therefore the slide 282, is thus locked against forward movement, which would place the wall 274 in the path of the molds. From the rear of each of the upper mold-holders 82, 82 is a projection 310 (Figs. 8 and 12), so located that, as each mold-pair arrives at the loading station, it will engage a forward contact-portion 312 of the lever, swinging this clockwise as viewed from above. This removes the lever 300 from the path of the lever 288 to the position of Fig. 12, permitting the lever 288 to be actuated to the full-line position of Fig. 13 to advance the wall 274 about the molds which have reached the loading position. As soon as the operator allows the spring 296 to withdraw the wall, the arm of the lever 288 passes to the rear of the contact member 306 and, when the advance of the molds begins, the contact member 306 is restored by the spring 302 to its slide-locking position, remaining there until the next mold-projection 310 frees the slide and wall for advance as before. When the slide 282 and wall 274 are forward in closing relation to the rear of a mold-pair, a rod 314, swiveled at 316 to the lever 288 (Fig. 13), lies at its forward end just beneath the hook 192 of the stop device d at station A (Figs. 11 and 21). Said latch is thus locked against depression, and the molds are locked against advance, they being freed only upon withdrawal of the wall and with it the rod 314. It will therefore be seen that the molds can be advanced into and out of station A only when the wall is retracted and there is no danger of injuring the projecting ends 276 of the wall.

Both pairs of molds having received their blanks s at station A, the operator a releases the molds from their latch d and forwards them to station B, where the pairs are successively latched at $d^1$ in position for the operator b to coat the surfaces l by use of the mechanism $B^1$. As to the present invention, the exact character of the coating mechanism is not important, it being only necessary that the coating applied is adequate. As appears in Fig. 26, cement from a container 320 mounted in a support 318 attached to the frame of the rink is supplied to a trough 322, in which is constantly rotated a supply-roll 324 journaled in the support. As is shown in Fig. 25, this supply-roll may be driven from a motor 321 and an interposed countershaft 323 through belt-gearing 325, while similar gearing 327 rotates the supply-roll 324' for the coating mechanism at the opposite side of the rink. When in position to take cement from the supply-roll, an applying roll 326 is rotated through gearing 328 for the distribution of a complete coating about its periphery. The applying roll is journaled in an arm 330 pivoted in a carrier 332 which is guided for vertical movement. By a handle 334, the operator b swings the arm in from the supply-roll to a position just above the surface of the two-filter-sections S, S held in the pairs of molds M, $M^1$ and $M^2$, $M^3$ successively positioned by the stop device $d^1$, and then lowers the carrier through a rod 336 upon depression of a treadle 338. A tension-spring 340 holds these elements normally raised. The applying roll passes over and coats simultaneously the surfaces l, of the positioned filter-section, and in the descent of the roll below the work, ratchet mechanism 342 causes said roll to be rotated sufficiently to present a fresh coating surface, when the operator releases the treadle and the carrier-arm and applying roll are elevated, to lay a second coating upon the surfaces l. In passing the points of the folds f in both its downward and upward travel, the applying roll leaves thereon beads of cement, which increase the adhesion and strengthen the portions of the filter likely to be weak. During the coating of the filter-sections in the molds M, $M^2$ the wall 166 guards against inward movement of the rolls 152.

After the filter-section in the second pair of molds has been coated at station B, they are freed from the latching device $d^1$ and the carrier 70 forwarded by the operator b to station C. Here, the latching device $d^2$ holds the molds for the removal of the filter, as already described. The holder $C^1$ at station C, upon which the joined sections of the filter are placed for lap-cementing, may be of the character shown in Figs. 29 and 32. In the present connection, it is necessary only that the filter be held in place with the laps readily accessible. This holder has a base 350 secured to one of the frame members 78. In the base a vertical spindle 352 is rotatable and longitudinally movable, it having fixed to its upper extremity a body 354 from which rises an annular flange 356. Fulcrumed to the opposite sides of the body are bell-crank-levers 358, 358, upwardly extending arms of which have arcuate lateral extensions 360 conforming to the exterior of the flange. Inwardly extending arms of the levers carry contact-screws 364, the heads of which are drawn against the base 350 by tension-springs 366 joining the upper arms to the body 354. The force of the springs urges the arm-extensions toward the flange and the screw-heads against the base, the latter elevating together the spindle and the elements which it carries. When the operator c removes a filter from the molds, he draws down the spindle through a rod 368 connected to a treadle 370 (Fig. 1). As the spindle descends, and with it the holder-body, the screws 364 are forced against the base, separating the arm-extensions from the flange 356. The operator places a filter upon the holder, with the outer fold f upon the flange, and releases the treadle. The springs 366 turn the levers 350 to force the extensions 360 against the outer wall of the filter and clamp it against the flange. Also, before the extensions had engaged the filter, the forcing of the screws 364 against the base had raised the holder-body, spindle, treadle-rod and treadle. The operator, working through the spaces between the ends of the lever-extensions, may apply cement successively to the laps e of each filter-section, turning the spindle in the base to give access to both sides and pressing said laps against the adjacent walls of the opposite sections, as appears in Fig. 35.

To outline the operation of the various mechanisms of this system for the performance of our method of filter-forming, that portion of the rink at the side toward the observer, which may be looked upon as the front of the rink, will alone be considered. A complete mold-assembly, made up of the pairs of molds M, M¹ and M², M³ with their carrier 70 suspended from the carriage running upon the track 54, arrives at station A, the operator at station C from the opposite side or rear of the rink having pushed it forward after the completion of a filter. The assembly enters station A with the pairs of molds alined, as appears in Figs. 2 and 8, it being held against lateral displacement by the engagement of the pairs of rolls 150, 152 with the opposite sides of the track 154. The roll 130 of the mold M³ encounters the incline 106 of the rail 102, this lifting said mold from its fully lowered relation of arrival to a position in which it is partially raised and intermeshed with the mold M². When the roll 130, running upon the surface 112 of the rail, reaches the hook 192 of the device d, it is stopped in loading position at the mechanism A¹, rebound being prevented by the plate 210. The operator, depressing the treadle 294, shifts the slide 254 and the loading elements which it carries, together with the mold-closing wall 274, into their active positions. Then, taking a creased blank s, he partially folds it, as indicated in Fig. 34, and introduces the left-hand side between the guiding partitions 262 into the opening 248 of the wall 250. The filter-folds are thus brought more closely together and guided into the passages betwen the mold-walls 84, 96, at once coming under the influence of the suction created through the opening 266 and conduit 270, 272. Thereby a force is exerted upon the leading portion of the filter-blank, relieving the operator of the necessity of so forcing the opposite end that the frail material might be deformed. At the opening 266, the final position of the blank is determined by the stop-rod 268, its opposite ends somewhat projecting from the mold-passages. The loading of the mold-pair M², M³ having been thus accomplished, the carrier is released from the device d by actuation of the knee-lever 220, which is promptly freed to bring the latches again into position for engagement with the roll 104 of the mold M¹, which follows the roll 130 along the rail-surfaces 106 and 108. The loading of the mold-pair M, M¹ follows in the same manner as just described. Both pairs of molds having been loaded, the assembly is advanced by operator a toward operator b at the cementing station B. During the loading of both pairs of molds, the locking members 309 and 314 prevented such movement of the molds into and out of loading position as might cause the ends of the wall 274 to be broken. In their travel, the rolls 130 and 104 successively contact with the incline 110 of the rail 102, so they run upon the higher rail-surface 112, the molds M¹ and M³ being so elevated that the opposite walls 84 and 96 are more closely intermeshed (Fig. 18) to apply, with the center-abutments 86 and 98, to the blank final forming pressure. In this condition, the formed filter-sections reach operator b at station B, and the section in the mold-pair M², M³ is stopped by the latching device d¹ opposite the cementing mechanism B¹. The operator here may first, with a finger or tool, bend outwardly from the center the projecting filter-ends l, except at the outer fold, which is bent inwardly, to give a greater joining surface. He then, through the handle 324 and treadle 338, causes the applying roll 326 to transfer cement simultaneously from the supply-roll 324 to the bent ends of the filter-section. There is laid upon these ends a coating during downward movement of the applying roll and a second coating upon upward movement with a greater quantity of the adhesive at the upper and lower points of the folds f. Having thus coated the ends of the filter-section in the molds M², M³, the molds M, M¹ are advanced to the coating position and similarly operated upon. As may best be understood from Fig. 31, the rolls 152 associated with the molds M², M³ are now so located that the inner roll of the pair may pass from their full-line position through the space 156 in the roll 154, and both rolls through the space 164 between the rail-sections 158 and 160 to their dotted-line position. Operator b, having applied cement to the section-ends l, l, swings the mold-pair M³, M⁴ about the pivot-rod 120 until the coated ends of the two sections are in contact. During this movement, the roll 130, which by contact with the surface 112 of the rail 102 has been holding the molding pressure upon the mold M³, will leave said surface (Fig. 9). However, this mold is still held up by contact of the projection 136 with the supporting surface 134 and the continuing surface 140 of the member 138. As operator B releases the latching device d¹ and advances the mold-assembly, the rolls 152, 152 pass at opposite sides of the rail-section 158 and, by its convergence toward the rail 154, the mold-pair M², M³ is forced toward the mold-pair M, M¹ to press the bent coated ends of the filter-sections together, causing them to adhere. When the rolls 152 reach the rail-section 160, which is parallel to the rail 154 or slightly converging toward this, the joining pressure is maintained sufficiently to insure proper adhesion. When the roll 130 reaches the overhead rail 174, the downwardly inclined edge of this rail cams the mold M³ away from the mold M², the supporting member 138 yielding, and immediately thereafter the overhead rail 170 similarly acts upon the roll 130 of the mold M¹ which has now left the rail 102. Since the two upper molds M and M² present twice the frictional filter-engaging surface that do the successively withdrawn molds M¹, M³, the filter remains in place in the upper molds, from which the lower molds are now separated to the same maximum extent as when they approached station A. At the diverging rail-section 162 at station C, to which the operator b forwarded the mold-assembly after bringing the filter-sections together, said assembly is positioned by the latching device d², with the rolls 150 and 152 located as appears in full lines in Fig. 31. The joining pressure held by the rail-section 160 is relieved, though the molds M², M³ are held against any substantial outward movement, because of the engagement of the inner roll 152 with the rail-section 162. Now the operator c may depress the stripping slide 182 to separate the joined filter from the mold-walls 84, so it may be removed from between the upper and lower molds. Depressing the treadle 370, the operator places the filter upon the holder C¹, releases the mold-assembly from the device d² and advances it until the roll 104 is against the surface 232 of the stop 234. The molds M², M³ may then be turned into alinement with the molds M, M¹, the outer roll 152 passing through the space 168 in the rail 154. Operator c pushes the unloaded assembly along the track 54 to the rear of the rink for utilization there. He applies cement to the inner faces of the laps e, e and to the opposed surfaces of the outer fold of the filter clamped upon the holder C¹, pressing the coated surfaces together. A second depression of the treadle 370 releases the completed filter so it may be removed from the holder.

Having thus described our invention, what we claim as new and desire to secure by Letters Patent of the United States is:

1. The method of forming sheet-material which consists in positioning a pair of molds to furnish between them passages for the reception of a blank of the material, partially folding the blank and introducing it into the passages, and pressing the molds relatively toward each other to form the blank.

2. The method of forming sheet-material which consists in positioning a pair of molds to furnish between them passages for the reception of a blank of the material, partially folding the blank and introducing it into the passages at one end, applying a force at the opposite end of the passages to complete the introduction of the blank, and pressing the molds relatively toward each other to form the blank.

3. The method of forming sheet-material which consists in positioning a pair of molds to furnish between them passages for the reception of a blank of the material, partially folding the blank and introducing it into the passages at one end, applying suction to the opposite end of the passages to complete the introduction of the blank, and pressing the molds relatively toward each other to form the blank.

4. The method of forming sheet-material which consists in positioning a pair of molds to furnish betwen them passages for the reception of a blank of the material, partially folding the blank and introducing it into the passages, advancing the molds after the introduction of the blank, pressing said molds relatively toward each other during their advance to form the blank, and separating the molds during their further advance to free the formed blank for removal.

5. The method of forming sheet-material which consists in advancing a pair of molds spaced from each other, bringing the molds together during their advance into position to receive a blank of the material, stopping the positioned molds at a predetermined point for the reception of the blank, partially folding the blank and introducing it between the molds, advancing the molds after the introduction of the blank, and pressing said molds relatively toward each other during their advance to form the blank.

6. The method of making articles from blanks of sheet-material which consists in partially folding blanks of the material and introducing them between the molds of each of two pairs of molds, pressing the molds of each pair relatively toward each other to form the interposed blank, applying an adhesive to coat a surface of each blank held between the molds, and bringing the coated surfaces into contact to join the formed blanks.

7. The method of making articles from blanks of sheet-material which consists in so positioning the molds of two pairs of molds that each pair furnishes between them series of passages for the reception of a blank of the material, partially folding blanks and introducing them into both series of passages so their ends project from the passages, pressing the molds of each pair relatively toward each other to form the interposed blank, applying an adhesive to coat the projecting ends of the formed blanks, forcing the pairs of molds relatively toward each other to cause the coated ends to adhere, and separating the molds of both pairs to free the article thus produced.

8. The method of making articles from blanks of sheet-material which consists in so positioning the molds of two pairs of molds that each pair furnishes between them series of passages for the reception of a blank of the material, partially folding blanks and introducing them into both series of passages so their ends project from the passages, pressing the molds of each pair relatively toward each other to form the interposed blank, applying an adhesive to coat the projecting ends of the formed blanks, forcing the pairs of molds relatively toward each other to cause the coated ends to adhere, separating the molds of both pairs to free the article thus produced, removing the article from the separated molds, and separating the pairs of molds.

9. The method of making sectional filters from two blanks of sheet-material which consists in advancing together two pairs of molds to an operating station with the pairs of molds alined in the direction of advance and with the molds of each pair separated sufficiently for the reception of a blank between them, partially folding blanks and introducing them at the station between the molds of each pair with portions projecting from the molds, advancing the pairs of molds to a second operating station, pressing the molds of each pair relatively toward each other during their advance to such second station to form two filter-sections, applying at the second station an adhesive to coat portions of both sections, moving the pairs of molds relatively to each other to bring together the coated portions of the sections, advancing the molds to a third operating station, pressing the pairs of molds relatively toward each other during such advance to join the filter-sections, and relieving the pressure between the molds of both pairs during such advance to prepare for the removal of the filter.

10. The method of making sectional filters from two blanks of sheet-material which consists in advancing together two pairs of molds to an operating station with the pairs of molds alined in the direction of advance and with the molds of each pair separated from each other, moving the molds of each pair relatively to each other during their advance so they together furnish passages, inserting a blank of the sheet-material in one end of the passages of each pair, applying suction to the opposite ends of the passages to draw the blanks to positions in which their opposite ends project from said passages, advancing the pairs of molds in alinement to a second operating station, pressing the molds of each pair relatively toward each other during their advance to such second station to form two filter-sections, applying at the second station an adhesive to coat the projecting portions of both sections, moving the pairs of molds relatively to each other to bring together the coated portions of the sections, advancing the molds in parallelism to a third operating station, pressing the pairs of molds relatively toward each other during such advance to join the filter-sections, and separating the molds of both pairs during such advance to free the filter for removal.

11. The method of making sectional filters from two blanks of sheet-material, each blank being provided with a lap-projection, which consists in advancing together two pairs of molds to an operating station with the pairs of molds alined in the direction of advance and with the molds of each pair separated sufficiently for the reception of a blank between them, partially folding blanks and introducing a folded blank between the molds of each pair, advancing the pairs of molds to a second operating station, pressing the molds of each pair relatively toward each other during their advance to such second station to form two filter-sections, applying at the second station an adhesive to coat portions of both sections, moving the pairs of molds relatively to each other to bring together the coated portions of the sections, advancing the molds in parallelism to a third operating station, pressing the pairs of molds relatively toward each other during such advance to join the filter-sections, separating the molds of both pairs during such advance to free the filter for removal, and removing the filter and cementing the lap-projection of each section to the companion-section at the third operating station.

12. Mechanism for forming an article from sheet-material comprising a carrier, and opposed molds mounted upon the carrier for movement relatively to each other into and out of active cooperation, each mold including a holder, series of concentric walls contained in the holder and securing means extending through each holder and through the contained walls.

13. Mechanism for forming an article from sheet-material comprising a carrier, a pair of molds mounted upon the carrier, a second pair of molds pivoted upon the carrier for movement between positions of alinement with the first pair and of parallelism with said first pair, the molds of both pairs being relatively movable into and out of active forming cooperation with each other, and means upon the carrier for maintaining such active cooperation of the molds of the pivoted pair during their movement into parallelism.

14. Mechanism for forming an article from sheet-material comprising a carrier, a pair of molds mounted upon the carrier, a second pair of molds pivoted upon the carrier for movement between positions of alinement with the first pair and of parallelism with said first pair, the molds of both pairs being relatively movable into and out of active forming cooperation with each other, and means upon the carrier for maintaining such active cooperation of the molds of the pivoted pair during their movement into parallelism, said means having a portion arranged to yield under the influence of a force applied to the pivoted pair.

15. Mechanism for forming an article from sheet-material comprising in combination a carrier, a pair of molds mounted upon the carrier, a second pair of molds mounted upon the carrier for movement between positions of alinement with the first pair and of parallelism with said first pair, the molds of both pairs being movable into and out of active forming cooperation with each other, and a stripper movable upon the carrier between the pairs of molds, when in parallel, for engagement with a formed article.

16. In a system for forming articles from blanks, the combination with a track, of a carrier movable upon the track, a mold mounted upon the carrier, a second mold movable upon the carrier for cooperation with the first mold, a rail extending along the track and engaged at successive portions by the second mold to position the second mold relatively to the first and then to change the relation thereof to the first mold, mechanism situated at stations spaced along the track and arranged to act in cooperation with the molds upon a blank to be formed, and stop devices for the carrier associated with the rail at the stations and releasable by successive operators at said stations.

17. In a system for making sectional filters from two blanks of sheet-material, the combination with a track, of a carrier movable upon the track, a pair of upper and lower molds mounted upon the carrier, a second pair of upper and lower molds pivoted upon the carrier to move toward and from the first pair of molds, the lower molds of both pairs being movable toward and from the upper molds of the respective pairs, the lower mold of the pivoted pair being provided with a projection, a rail engaged by the lower molds of both pairs to raise said molds and force them toward the upper molds to press blanks between them to form the filter-sections, a rail acting upon the pivoted pair of molds to press the formed filter-section between them against the formed filter-section between the companion-pair of molds, and a member associated with the mold-pivot and having a supporting surface upon which the lower mold-projection may rest during the pivotal movement.

18. In a system for making sectional filters from two blanks of sheet-material, the combination with a track, of a carrier movable upon the track, a pair of upper and lower molds mounted upon the carrier, a second pair of upper and lower molds pivoted upon the carrier to move toward and from the first pair of molds, the lower molds of both pairs being movable toward and from the upper molds of the respective pairs, the lower mold of the pivoted pair being provided with a projection, a rail engaged by the lower molds of both pairs to raise said molds and force them toward the upper molds to press blanks between them to form the filter-sections, a rail acting upon the pivoted pair of molds to press the formed filter-section between them against the formed filter-section between the companion-pair of molds, rails acting upon the lower molds of both pairs to separate them successively from the upper molds, and a member associated with the mold-pivot and having a supporting surface upon which the lower mold-projection may rest during the pivotal movement, said member having a portion yieldable under the influence of the projection when the lower molds are separated.

19. In a system for forming articles, a track, a carrier movable upon the track, a pair of upper and lower molds, a mounting for said pair fixed against movement upon the carrier, a second pair of upper and lower molds, a mounting for said second pair pivoted upon the carrier to swing between positions of alinement with the fixed pair and parallelism with said fixed pair, the mounting for each pair having spaced projections and the lower molds of both pairs being movable toward and from the respective upper molds and each having a projection, a rail engaged by the projections from the lower molds in the travel of the carrier to vary their relation to the upper molds, and a rail upon the opposite sides of which the projections from the mountings of the mold-pairs travel to determine the relation of the pairs to the molds of each other.

20. In a system for forming articles, a track, a carrier movable upon the track, a pair of upper and lower molds, a mounting for said pair fixed against movement upon the carrier, a second pair of upper and lower molds, a mounting for said second pair pivoted upon the carrier to swing between positions of alinement with the fixed pair and parallelism with said fixed pair, the mounting of each pair having spaced projections and the lower molds of both pairs being movable toward and from the respective upper molds and each having a projection, a rail engaged by the projections from the lower molds in the travel of the carrier to vary their relation to the upper molds, a rail upon the opposite sides of which the projections from the mountings of the mold-pairs travel to maintain the alined relation of the pairs of molds, and a rail upon the opposite sides of which said projections travel to maintain substantially the parallel relation of the pairs of molds.

21. In a system for forming articles, a track, a carrier movable upon the track, spaced rods depending from the carrier, a bar connecting the lower ends of the rods and having spaced projections, an upper mold mounted upon the carrier, a lower mold slidable upon the rods and having a projection, a pivot-rod extending between the carrier and the bar, upper and lower arms arranged to turn upon the pivot-rod, there being spaced projections from the lower arm, spaced rods connecting the arms, an upper mold mounted upon the upper arm, a lower mold slidable upon the rods connecting the arms and having a projection, a rail engaged by the projections of the lower molds to determine the relation of said lower molds to the upper molds, and a rail along the opposite sides of which the projections from the bar and lower arm may travel to determine the relation of the pivoted pair of molds to the associated pair.

22. In a system for forming articles, a track, a carrier movable upon the track, spaced rods depending from the carrier, a bar connecting the lower ends of the rods and having spaced projections, an upper mold mounted upon the carrier, a lower mold slidable upon the rods and having a projection, a pivot-rod extending between the carrier and the bar, upper and lower arms arranged to turn upon the pivot-rod, there being spaced projections from the lower arm, spaced rods connecting the arms, an upper mold mounted upon the upper arm, a lower mold slidable upon the rods connecting the arms and having a projection, a rail engaged by the projections of the lower molds to determine the relation of said lower molds to the upper molds, a rail along the opposite sides of which the projections from the bar and lower arm may travel to hold the pairs of molds in alinement, and a rail along which the projections from the lower arm may travel to hold the pivoted pair of molds substantially parallel to the associated pair.

23. In a system for forming articles, a track, a carrier movable upon the track, spaced rods depending from the carrier, a bar connecting the lower ends of the rods and having spaced projections, an upper mold mounted upon the carrier, a lower mold slidable upon the rods and having a projection, a pivot-rod extending between the carrier and the bar, upper and lower arms arranged to turn upon the pivot-rod, there being spaced projections from the lower arm, spaced rods connecting the arms, an upper mold mounted upon the upper arm, a lower mold slidable upon the rods connecting the arms and having a projection, a rail engaged by the projections of the lower molds to determine the relation of said lower molds to the upper molds, a rail along the opposite sides of which the projections from the bar and lower arm may travel to hold the pairs of molds in alinement, and a rail along which the projections from the lower arm may travel to hold the pivoted pair of molds parallel to the associated pair, there being spaces in the rails through which the projections opon the pivoted arm may pass.

24. In a system for forming articles, a track, a carrier movable upon the track, spaced rods depending from the carrier, a bar connecting the lower ends of the rods and having spaced projections, an upper mold mounted upon the carrier, a lower mold slidable upon the rods and having a projection, a pivot-rod extending between the carrier and the bar, upper and lower arms arranged to turn upon the pivot-rod, there being spaced projections from the lower arm, spaced rods connecting the arms, an upper mold mounted upon the upper arm, a lower mold slidable upon the rods connecting the arms and having a projection, a rail engaged by the projections of the lower molds to determine the relation of said lower molds to the upper molds, a rail along the opposite sides of which the projections from the bar and lower arm may travel to hold the pairs of molds in alinement, a rail along which the projections from the lower arm may travel to hold the pivoted pair of molds parallel to the associated pair, there being spaces in the rails through which a projection upon the pivoted arm may pass outwardly in the movement of the pivoted pair to their parallel relation, and a wall situated opposite one of the spaces and preventing inward movement of the projections.

25. In a system for forming articles from blanks, a traveling carrier, a pair of molds movable relatively to each other upon the carrier to form an interposed blank, and a suction mechanism to which the molds are presented by the carrier and which is adapted to draw a blank between said molds.

26. In a system for forming articles from blanks, a traveling carrier, a pair of molds movable relatively to each other upon the carrier to form an interposed blank, a suction mechanism to which the molds are presented by the carrier and which is adapted to draw a blank between said molds, and means made effective in the travel of the carrier from said mechanism to actuate the mold-pair to form the interposed blank.

27. In a system for forming articles from blanks, a traveling carrier, a pair of molds movable relatively to each other upon the carrier to form an interposed blank, a suction mechanism to which the molds are presented by the carrier and which is adapted to draw a blank between said molds, means made effective in the travel of the carrier from the suction mechanism to actuate the mold-pair to form the interposed blank, and means made effective in the further travel of the carrier for freeing the formed blank from the molds.

28. In a system for forming articles from blanks, a traveling carrier, a pair of molds movable relatively to each other upon the carrier to form an interposed blank, a suction mechanism which is adapted to draw a blank between said molds, and a device by which the carrier is stopped in a position in which said suction mechanism may be moved to cooperate with the molds for the reception of a blank by the molds.

29. In a system for forming articles from blanks, a traveling carrier, a pair of molds movable relatively to each other upon the carrier to form an interposed blank, and a suction mechanism to which the molds are presented by the carrier and which is adapted to draw a blank between said molds, said mechanism being mounted for movement toward and from the path of the molds.

30. In a system for forming sectional filters from blanks of sheet-material, a track, a carrier movable upon the track, two pairs of molds upon the carrier, the molds of each pair being movable relatively toward and from the other and the pairs of molds being movable relatively toward and from each other from a position of alinement along the track to a position of parallelism with each other, suction mechanism to which the pairs of molds are successively presented by the carrier and which is adapted to draw blanks between said pairs of molds, means made effective in the travel of the carrier to actuate the mold-pairs successively to form the interposed blanks into filter-sections in the alined relation of the pairs of molds, mechanism to which the pairs of molds are presented in further travel in their alined relation to apply a coating of an adhesive to the formed filter-sections, and means made effective in the still further travel of the carrier for pressing together the coated surfaces of the filter-sections.

31. In a system for forming sectional filters from blanks of sheet-material, a track, a carrier movable upon the track, two pairs of molds upon the carrier, the molds of each pair being movable relatively toward and from the other and the pairs of molds being movable relatively toward and from each other from a position of alinement along the track to a position of parallelism with each other, suction mechanism to which the pairs of molds are successively presented by the carrier and which is adapted to draw blanks between said pairs of molds, means made effective in the travel of the carrier to actuate the mold-pairs successively to form the interposed blanks into filter-sections in the alined relation of the pairs of molds, mechanism to which the pairs of molds are presented in further travel in their alined relation to apply a coating of an adhesive to the formed filter-sections, means made effective in the still further travel of the carrier for pressing together the coated surfaces of the filter-sections, and means made effective in the still further travel of the carrier for separating from each other the molds of both pairs to free the filter.

32. In a system for forming sectional filters from blanks of sheet-material, a track, a carrier movable upon the track, two pairs of molds upon the carrier, the molds of each pair being movable relatively toward and from the other and the pairs being movable relatively toward and from each other from a position of alinement along the track to a position of parallelism with each other, suction mechanism to which the pairs of molds are successively presented by the carrier and which is adapted to draw blanks between said pairs of molds, means made effective in the travel of the carrier to actuate the mold-pairs successively to form the interposed blanks into filter-sections in the alined relation of the pairs of molds, mechanism to which the pairs of molds are presented in further travel in their alined relation to apply a coating of an adhesive to the formed filter-sections, means made effective in the still further travel of the carrier for pressing together the coated surfaces of the filter-sections, a device by which the carrier is stopped in its travel with the pairs of molds successively in cooperation with the suction mechanism, and a device by which the carrier is stopped with the pairs of molds successively in cooperation with the coating mechanism.

33. In a system for forming sectional filters from blanks of sheet-material, a track, a carrier movable upon the track, two pairs of molds upon the carrier, the molds of each pair being movable relatively toward and from the other and the pairs being movable relatively toward and from each other from a position of alinement along the track to a position of parallelism with each other, suction mechanism to which the pairs of molds are successively presented by the carrier and which is adapted to draw blanks between said pairs of molds, means made effective in the travel of the carrier to actuate the mold-pairs successively to form the interposed blanks into filter-sections in the alined relation of the pairs of molds, mechanism to which the pairs of molds are presented in further travel in their alined relation to apply a coating of an adhesive to the formed filter-sections, means made effective in the still further travel of the carrier for pressing together the coated surfaces of the filter-sections, means made effective in the still further travel of the carrier for separating from each other the molds of both pairs to free the filter, a device by which the carrier is stopped in its travel after such separation of the molds for the removal of the filter while the pairs are still in substantially their parallel relation, and a device by which the carrier is stopped after further travel to permit the restoration of the mold-pairs to their alined relation.

34. In a system for forming sectional filters from blanks of sheet-material, a track, a carrier movable upon the track, two pairs of molds upon the carrier, the molds of each pair being movable relatively toward and from the other and the pairs being movable relatively toward and from each other from a position of alinement along the track to a position of parallelism with each other, suction mechanism to which the pairs of molds are successively presented by the carrier and which is adapted to draw blanks between said pairs of molds, rails extending along the track and acting upon the mold-pairs successively in the travel of the carrier to form the interposed blanks into filter-sections in the alined relation of the pairs of molds, mechanism to which the pairs of molds are presented in the further travel of the carrier in their alined relation to apply a coating of an adhesive to the formed filter-sections, and rails extending along the track and acting upon the pairs of molds in the still further travel of the carrier for pressing together the coated surfaces of the filter-sections.

35. In a system for forming sectional filters from blanks of sheet-material, a track, a carrier movable upon the track, two pairs of molds upon the carrier, the molds of each pair being movable relatively toward and from the other and the pairs being movable relatively toward and from each other from a position of alinement along the track to a position of parallelism with each other, suction mechanism to which the pairs of molds are successively presented by the carrier and which is adapted to draw blanks between said pairs of molds, rails extending along the track and acting upon the mold-pairs successively in the travel of the carrier to form the interposed blanks into filter-sections in the alined relation of the pairs of molds, mechanism to which the pairs of molds are presented in the further travel of the carrier in their alined relation to apply a coating of an adhesive to the formed filter-sections, rails extending along the track and acting upon the pairs of molds in the still further travel of the carrier for pressing together the coated surfaces of the filter-sections, and rails extending along the track and acting successively upon the mold-pairs in the still further travel of the carrier to free the filter-sections.

36. In a rink-system for forming sectional filters from blanks having laps, a continuous track, a plurality of carriers movable throughout the circuit of the track, cooperating pairs of molds movable relatively toward and from each other upon each carrier, the molds of each pair being movable relatively toward and from each other upon their carrier, a plurality of series of operating mechanisms arranged at successive stations along the track and each series including means for drawing blanks between the molds of both pairs presented by each carrier, means for applying cement to the blanks in both pairs of said molds and means for holding a filter while the laps are being cemented, and a series of rails extending along the track at each series of stations and acting upon the molds in the travel of the carriers to force relatively toward each other the molds of both pairs to form the interposed blanks, to force relatively toward each other the pairs of molds to join the formed and cemented filter-sections and to separate both pairs of molds to free the filter for application to the holder.

37. In a system for forming articles from blanks, a carrier, upper and lower molds mounted upon the carrier for relative movement toward and from each other and each having a series of walls spaced from one another, the walls of the two molds being arranged to intermesh to furnish passages between them for the reception of a blank, a wall cooperating with the molds and provided with two openings arranged to register with the ends of the mold-passages, and means for applying suction to the mold-passage through one of the wall-openings at the side opposite the molds.

38. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, means for applying suction to the mold-passages through one of the wall-openings at the side opposite the molds, and means at said wall-opening for limiting the movement of the blank through the mold-passages under the influence of the suction.

39. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, means for applying suction to the mold-passages through one of the wall-openings at the side opposite the molds, and a series of spaced walls lying across the other opening and arranged to direct into the mold-passages a partially folded blank.

40. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, means for applying suction to the mold-passages through one of the wall-openings at the side opposite the molds, means at said wall-opening for limiting the movement of the blank through the mold-passages under the influence of the suction, a platform in front of the other wall-opening for the support of the blanks to be introduced into the mold-passages through said opening, and means for holding a portion of each blank as it is introduced out of engagement with the platform.

41. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, and means for applying suction to the mold-passages through one of the wall-openings at the side opposite the molds, the wall and suction means being movable into and out of active position.

42. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, means for applying suction to the mold-passages through one of the wall-openings at the side opposite the molds, and a wall arranged to enclose the molds at the side opposite the suction means.

43. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, means for applying suction to the mold-passages through one of the wall-openings at the side opposite the molds, and a wall arranged to enclose the molds at the side opposite the suction means, said wall being movable into and out of active position.

44. In a system for forming articles from blanks, a track, a carrier movable upon the track, upper and lower molds mounted upon the carrier for relative movement toward and from each other, means for drawing a blank between the molds, said drawing means being movable into and out of active position, means for normally locking the drawing means in an inactive position, and means controlled by the molds in their movement for releasing the locking means.

45. In a system for forming articles from blanks, a track, a carrier movable upon the track, upper and lower molds mounted upon the carrier for relative movement toward and from each other, means supported at opposite sides of the path of the molds for aiding in the introduction of a blank between said molds, said aiding means being movable into and out of active position, means for actuation by an operator to move the aiding means, and a locking member cooperating with the operator-actuated means and movable by the molds to release said operator-actuated means.

46. In a system for forming articles from blanks, a track, a carrier movable upon the track, upper and lower molds mounted upon the carrier for relative movement toward and from each other, means for drawing a blank between the molds, said drawing means being movable into and out of active position, releasable means for retaining the molds in cooperation with the drawing means, and means controlled in the movement of the drawing means for releasing the retaining means.

47. In a system for forming articles from blanks, a track, a carrier movable upon the track, upper and lower molds mounted upon the carrier for relative movement toward and from each other, means for drawing a blank between the molds, said drawing means being movable into and out of active position, a latching device for retaining the molds in cooperation with the drawing means, a movable member by which the latching device is locked in its retaining relation, and an operator-actuated member for moving the drawing means and connected to the locking member to effect its movement to release the latching device.

48. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, means for applying suction to the mold-passages through one of the wall-openings at the side opposite the molds, a wall arranged to enclose the molds at the side opposite the suction means and being movable between active and inactive positions, means for normally locking the last-mentioned wall against movement for its inactive position, and means effective to free said wall from the locking means only when the molds are in blank-receiving position.

49. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, means for applying suction to the mold-passages through one of the wall-openings at the side opposite the molds, a wall arranged to enclose the molds at the side opposite the suction means, both walls and the suction means being movable between active and inactive positions, and means arranged to move the two walls and the suction means simultaneously between their positions.

50. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, means for applying suction to the mold-passages through one of the wall-openings at the side opposite the molds, a wall arranged to enclose the molds at the side opposite the suction means, both walls and the suction means being movable between active and inactive positions, means for actuation by an operator to shift the walls and the suction means, and a locking member for engagement with the operator-actuated means, said locking means being actuated by the molds upon their registration with the wall-opening to release the operator-actuated means.

51. In a system for forming articles from blanks, a track, a carrier movable upon the track, upper and lower molds mounted upon the carrier for relative movement toward and from each other and each having a series of semicircular walls spaced from one another, the walls of the two molds being arranged to intermesh in their relative movement to furnish passages between them for the reception of a blank, a wall situated beside the path of the molds and provided with two openings into registration with which the ends of the mold-passages may be brought in the movement of the carrier, a latch for retaining the molds in such registration, means for applying suction to the mold-passages through one of the wall-openings at the side opposite the molds, a wall arranged to enclose the molds at the side opposite the suction means, a locking member for the latch, means for actuation by an operator to shift the walls and the suction means, a locking member for engagement with the operator-actuated means and being actuated by the molds upon their registration with the wall-opening to release the operator-actuated means, and means for communicating the movement of the operator-actuated means to the locking member for the latch to release said latch.

ROY W. CUMMINGS.
GEORGE F. C. BURKE.

REFERENCES CITED

The following references are of record in the file of this patent:

UNITED STATES PATENTS

| Number | Name | Date |
|---|---|---|
| 1,959,612 | Burke | May 22, 1934 |
| 1,981,694 | Freeman | Nov. 20, 1935 |
| 1,989,015 | McKellip | Jan. 22, 1935 |
| 2,015,647 | Martindell | Sept. 24, 1935 |
| 2,179,317 | Barnard | Nov. 7, 1939 |
| 2,230,189 | Ferngren | Jan. 28, 1941 |
| 2,302,757 | Filsinger | Nov. 24, 1942 |